(12) United States Patent
Takamoto et al.

(10) Patent No.: US 7,353,240 B1
(45) Date of Patent: Apr. 1, 2008

(54) METHOD AND STORAGE SYSTEM THAT ENABLE SHARING FILES AMONG MULTIPLE SERVERS

(75) Inventors: Yoshifumi Takamoto, Kokubunji (JP); Kiyohiro Obara, Hachioji (JP); Naoki Watanabe, Sunnyvale, CA (US); Hiroaki Odawara, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/031,381

(22) PCT Filed: Sep. 29, 1999

(86) PCT No.: PCT/JP99/05357

§ 371 (c)(1),
(2), (4) Date: Jan. 18, 2002

(87) PCT Pub. No.: WO01/24010

PCT Pub. Date: Apr. 5, 2001

(51) Int. Cl.
*G06F 17/30* (2006.01)
(52) U.S. Cl. .......................... 707/200; 707/1; 707/203
(58) Field of Classification Search ............. 707/1–10, 707/200, 203, 100, 101, 205; 709/213, 214; 711/147
See application file for complete search history.

(56) References Cited

U.S. PATENT DOCUMENTS 6,549,918 B1 * 4/2003 Probert, Jr. et al. ......... 707/203

FOREIGN PATENT DOCUMENTS

| JP | 05-265661 | 1/1993 |
|----|-----------|--------|
| JP | 09-128277 | 10/1995 |
| JP | 09-179758 | 12/1995 |
| JP | 9-237163  | 2/1996 |
| JP | 09-325905 | 6/1996 |
| JP | 10-254742 | 3/1997 |

OTHER PUBLICATIONS

Computopia, 33 (380) (May 1, 1998), Kabushiki Kaisha Computer Age K.K. Storage Sensen ni Ijou ari; Java ga Storage wo kaeru Multi Platform Storage ni Honkaku Sannyuu shita SAN no Senryaku, pp. 34-37.

* cited by examiner

*Primary Examiner*—Don Wong
*Assistant Examiner*—Marcin Filipczyk
(74) *Attorney, Agent, or Firm*—Reed Smith LLP; Stanley P. Fisher, Esq.; Juan Carlos A. Marquez, Esq.

(57) ABSTRACT

A method is provided for sharing a file among a plurality of hosts; the file is stored in a disk device shared among the plurality of hosts, each of which uses an operating system (OS) having a different format. In general, a management system of a file is different depending on the OS. Therefore, because a stored location of the file is unknown, it is not possible to view the file, which is managed by a management system of a certain OS, from the other OSs. Therefore, a method is provided whereby stored-location information of the file, which is managed by a management system of a first OS, is converted into stored-location information that is managed by a second OS format. Then, the second OS reads the file on the basis of the stored-location information that has been converted.

14 Claims, 33 Drawing Sheets

701 BOOT PROGRAM
702 PARTITION INFORMATION
703 FILE INFORMATION
704 DATA AREA
705 BOOT PROGRAM
706 FILE INFORMATION
707 DATA AREA

| HOST ID | TYPE OF FILE-SYSTEM | TYPE OF TARGET FILE-SYSTEM | CONTROL VOLUME |
|---|---|---|---|
| 01 | FILE SYSTEM 1 | FILE SYSTEM 1 | 4096 |
| 02 | FILE SYSTEM 2 | FILE SYSTEM 2 | 1024 |
| ⋮ | ⋮ | ⋮ | ⋮ |

110

| FILE NAME | LOCK/ UNLOCK | HOST ID | LOCK-OWNER | LOCK-NUMBER |
|---|---|---|---|---|
| A | LOCK | HOST A | APPLICATION A | 1 |
| B | UNLOCK | | | 0 |
| C | LOCK | HOST A | APPLICATION B | 2 |
| D | UNLOCK | | | 0 |
| ⋮ | ⋮ | ⋮ | ⋮ | ⋮ |

2501 2502 2503 2504 2505

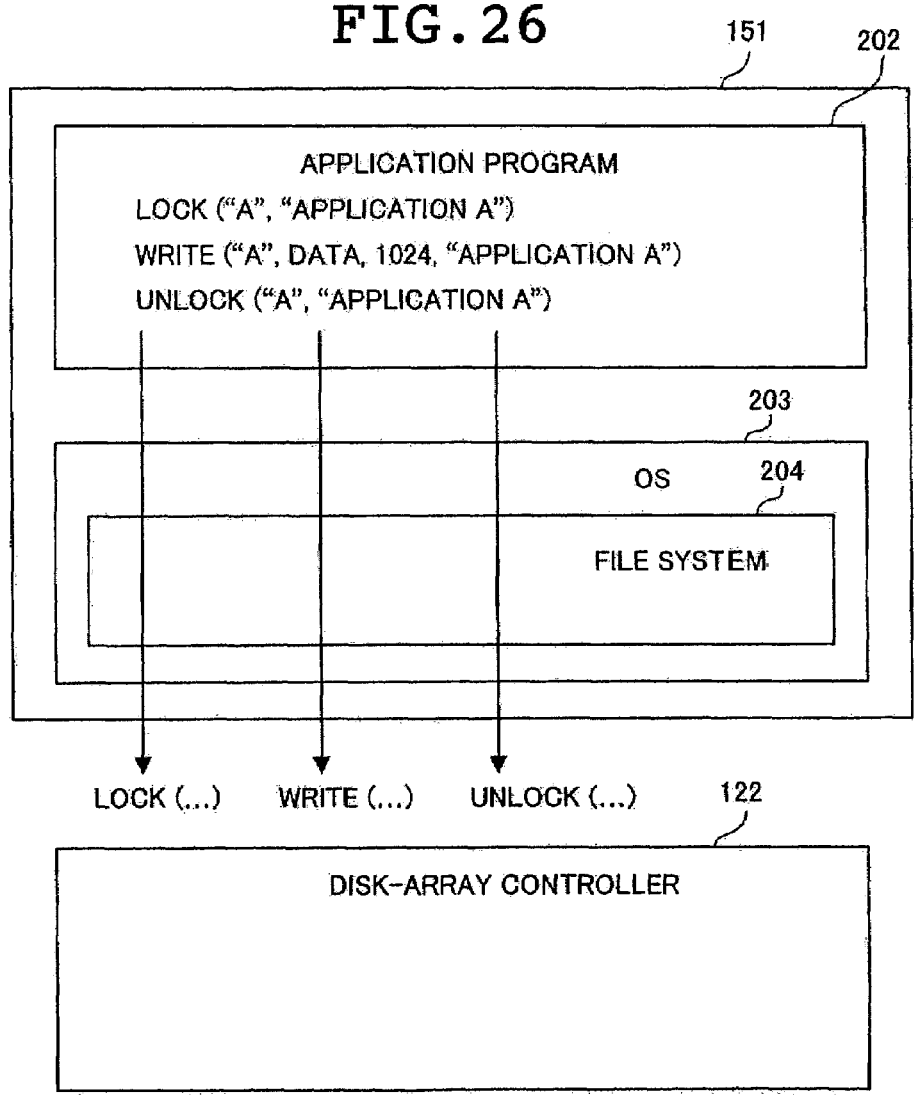

METHOD AND STORAGE SYSTEM THAT ENABLE SHARING FILES AMONG MULTIPLE SERVERS

TECHNICAL FIELD

The present invention relates to a method for sharing files among a plurality of hosts; the files are stored in disk drives shared among the plurality of hosts, each of which uses a different type of OS.

BACKGROUND ART

In general, a computer uses magnetic disk devices having high cost performance as devices for storing data. Because a magnetic disk is accompanied by mechanical operation, a processing speed is low (about 10 msec) as compared with that of a processor. Even if the processor is speeded up, unless the disk is speeded up, there are many cases where performance of the whole system is not improved. As a means for solving this problem, there is a disk array. As described in W. David Schwaderer, Andrew W. Wilson, Jr., "Understanding I/O Subsystems First Edition" pp. 271-291, the disk array is a technique for improving performance and reliability not only by arranging data on a plurality of drives in a distributed manner, but also by storing redundant data in the drives. In an especially large-scale system, performance and reliability are required at the same time. This is the reason why the disk array is used.

In recent years, a hopeful view is taken on a fiber channel as an interface for connecting between a disk array and a host. SCSI (Small Computer System Interface) can extend a connection distance only to several tens of meters, whereas the fiber channel can extend a connection distance to several kilometers. In addition, the number of devices, which can be connected to the fiber channel, is several times as many as the number of devices that can be connected to SCSI. As opposed to a local area network (LAN) used for data communication between hosts, a storage area network (SAN), which is used for data communication between a host and the other devices (for example, storage subsystems), receives attention in recent years. The fiber channel is also used as a communication medium of the storage area network. The fiber channel is standardized. If a device and a host comply with the standard, they can be connected to the storage area network. For example, it is possible to connect a disk array having a fiber channel interface to a plurality of hosts.

As a disclosed method for sharing data between a plurality of hosts, there is Japanese Patent Application Laid-Open No. Hei 9-325905 (hereinafter referred to as "document 1"). The document 1 discloses a disk device having a function of converting between a CKD (Count Key Data) format, which is a data format adopted in mainframes, and a FBA format that is a data format adopted in UNIX and the like. In this case, the format means structure of a minimum unit of data, which is transferred between a host and a disk device. The CKD is a variable-length format; and the FBA is a fixed-length format. In a disk, which stores data in the CKD format, user data, a data length, and a key used for searching are stored. For example, when writing user data having a length of 2048 bytes into a disk, a data length, a key value, and the data having a length of 2048 bytes are written at a time. On the other hand, as regards the FBA format, when writing user data having a length of 2048 bytes on a disk similarly, data having a length of 2048 Kbytes is stored in a disk on a basis of a divided block having a fixed length of 512 bytes. In the FBA, a data length and a key are not stored. As described above, even if the same disk drive is used, data storing formats used in the disk drive are different depending on kinds of hosts. Therefore, it is not possible to share data between different hosts. In order to solve this problem, the document 1 describes the following function: when a disk stored in the CKD format is accessed in the FBA format, converting a data portion of CKD into blocks in the FBA format.

As another file sharing technique, there is Japanese Patent Application Laid-Open No. Hei 9-179758 (hereinafter referred to as "document 2"). The following technology is disclosed in the document 2. Data are written into a data sharing area in a writable recording medium. In addition to it, a plurality of file tables, by which data management information, which is required when accessing data, can be referred to from two or more kinds of operating systems individually, are written into the recording medium.

DISCLOSURE OF INVENTION

One of objects of the SAN described above is to enable a free access from platforms of various OSs (operating system), which are connected to the SAN, to a storage system that is connected to the SAN similarly. Accordingly, it is desired that files can be shared among platforms having different OSs.

If a device, which is connected to a fiber channel, complies with a prescribed communication protocol, the device can physically access to other devices, which are connected to the fiber channel. For example, when a host is connected to a disk device through the fiber channel, the host can read from and write into a physical area of the disk device, that is to say, a fixed-length block area called a sector as a minimum access unit of the disk.

However, a kind of data, and a method for storing the data in a disk area, are not determined by the communication protocol, but determined by an operating system working on the host. Therefore, even if hosts on which a different OS is loaded respectively is physically connected to a storage system through the fiber channel, etc., files in the storage system cannot be shared. This is because each of the OSs can not recognize file information managed by the other OSs.

If it is described in detail, a control program in the disk area, which is called "file system" in the operating system, manages an area in the disk. For example, if an application program on the host requests creation of a file A, data of the file A is stored in any given area in the disk, which has been determined by the file system. The application program is not required to know the area in the disk, in which data of the file A has been stored. For example, it is assumed that a first host on which a first operating system is loaded, and a second host on which a second operating system different from the first operating system is loaded, are connected to the disk device through the fiber channel. In this case, the disk device may be physically accessed from the first host and from the second host. However, in general, because a disk area management method of the file system is different depending on the operating system, the file, which has been stored by the file system of the first operating system, cannot be read from the second operating system. It is because where and how the file is stored are not known. For example, on the assumption that the first operating system is UNIX, and that the second operating system is Microsoft Windows of Microsoft Corp., the file, which has been stored by a file system of UNIX, cannot be read from Microsoft Windows.

The disk array device described in the document 1 has only a function of converting data format. Therefore, if data, for which conversion of a data format is desired, is identified, it is possible to share the data between a mainframe and an open system host by using a method of the document 1. However, in general, a user accesses a set of data called a file. In addition to it, individual data is not stored in the disk unit in succession. Therefore, if a file created by the other host is accessed, unless a location on the disk unit, where the file is stored, is known, the file cannot be read using the method of the document 1.

On the other hand, as regards the method disclosed in the document 2, each host is required to know a location of management information, which has been stored using the same format as that of the file system in its own host, beforehand. In other words, an access is possible only by a host knowing that management information of a plurality of file systems is stored in a storage medium. This is because general file systems are based on the premise that management information is allocated to a specific predetermined location in a media. There is a specific area, which is decided by a file system independently. For example, management information is allocated from the top of the second block in a recording medium. If completely different data is written into this area, the file system cannot operate normally. Moreover, there is the following problem relating to management: because it is necessary to manage a location, where management information of the file system corresponding to the own host is stored, on the host side, if for example a location, where the management information is stored, is changed in a recording medium, data on the host side must also be changed in response to it. On the other hand, if the OS loaded on a computer, which is connected to the recording medium, is changed, the management information in the recording medium must be rewritten. Because a size required to store management information is different depending on the OS, a change of the management information may be accompanied by difficulties in reserving an area, and the like. Furthermore, because management information of a plurality of file systems must be stored in a single media, there is also a problem of reduction in an available area.

For this reason, an object of the present invention is to provide a disk device, which permits a plurality of hosts, each of which has a different platform, to share files, even if the host does not know a location on the disk device, where data to be accessed is stored, and even if a location where management information of the file system is stored is not managed on the host side.

In order to attain the objects described above, in the present invention, the disk array controller comprises a program for converting a format of a file system, and a correspondence table of a host and a file system operating thereon. When the management information of the file system is accessed from the host, the file management information corresponding to the file system is accessed with reference to the correspondence table.

BRIEF DESCRIPTION OF DRAWINGS

FIG. 26 is a diagram illustrating control used when an application, which operates in a host, locks/unlocks a disk array controller.

BEST MODES FOR CARRYING OUT THE INVENTION

Embodiment 1

Figure 1:
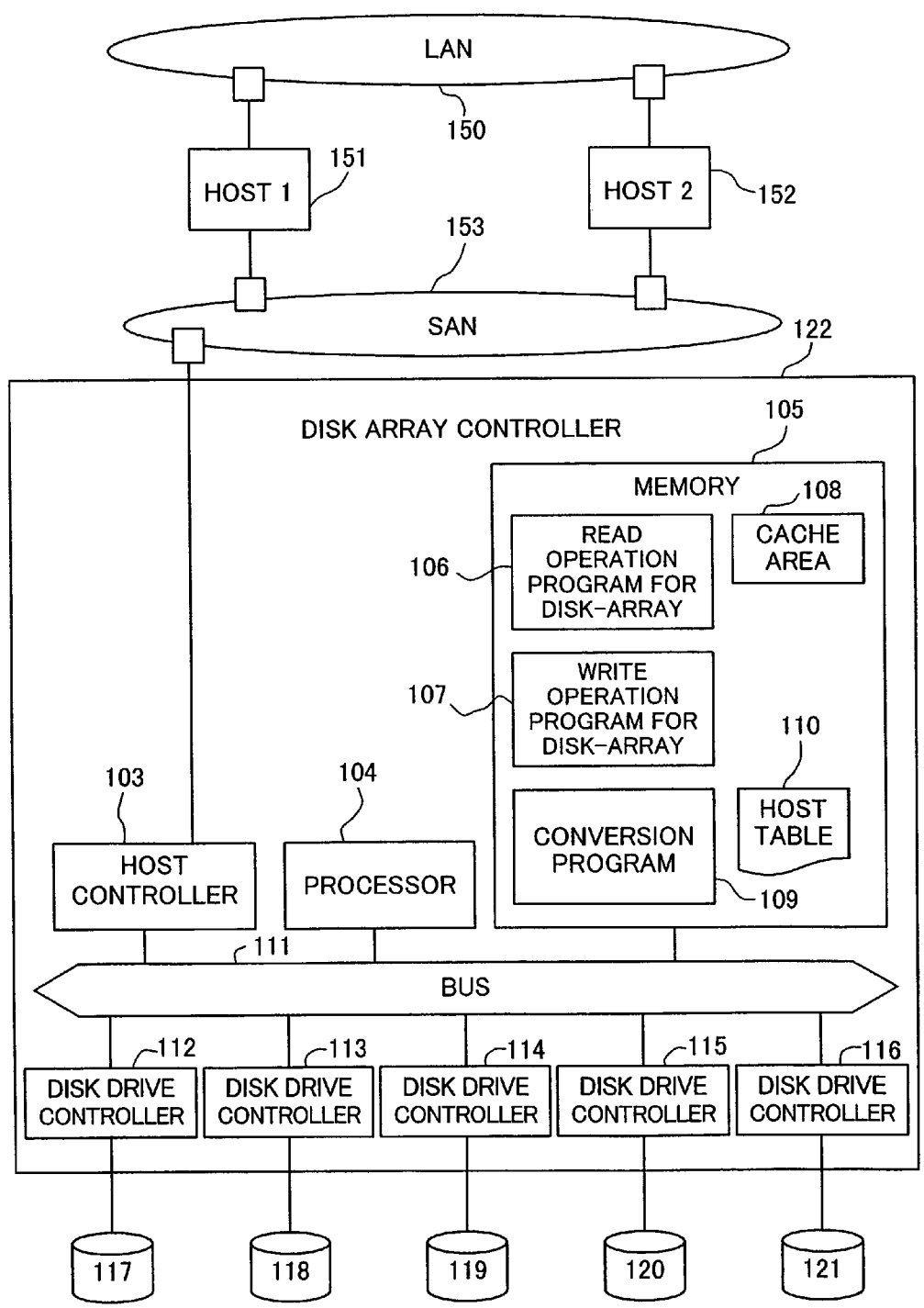
FIG. 1 is a diagram illustrating a configuration of a whole system that uses a storage system of an embodiment 1 according to the present invention.

FIG. 1 is a diagram illustrating a configuration of a whole system that uses a storage system according to the present invention. A host 1 (151) and a host 2 (152) are host computers, each of which is based on an OS platform that is different from each other. This point will be described later. Reference numeral 122 is a disk array controller, and reference numerals 117 through 121 are disk drives. In this embodiment, the disk array controller 122 and disk drives 117 through 121 constitute a storage subsystem. This storage subsystem is connected to the host 1 and the host 2 through SAN (Storage Area Network) 153. In addition, a LAN (Local Area Network) 150 is connected between the host 1 and the host 2. The LAN 150 is mainly used for communication between the hosts, and the SAN 153 is mainly used for data input/output for the storage subsystem. LAN uses a communication protocol, which is different from that used for SAN. In general, SAN provides higher data transfer performance than LAN. Therefore, SAN is more suitable for large-scale data transfer such as data input/output for the storage subsystem.

When an input/output request is issued from the host 1 or the host 2, the disk array controller 122 interprets the input/output request, and then performs an input/output for the disk drives 117 through 121 corresponding to the input/output request. The disk array controller 122 comprises a host controller 103, a control processor 104, a memory 105, drive controllers 112 through 116, and a bus 111 for connecting them. The host controller 103 receives the input/output request issued from the host 1 or the host 2. After input/output processing is completed, the host controller 103 notifies the host, which issued the request, of the completion of processing. The drive controllers 112 through 116 control data input/output for the drives 117 through 121. The host controller 103 and the drive controllers 112 through 116 operate according to instructions such as start/end, and data transfer from the control processor 104. Operation of the control processor 104 is described in programs and tables stored in the memory 105. A disk-array read program 106 is a control program for controlling an input request issued from the host 1 or the host 2. A disk-array write program 107 is a control program for controlling an output request issued from the host 1 or the host 2. A conversion program 109 is a program for converting a data format stored in the drives. In a host table 110, information about kinds of data formats supported by a connected host is stored. A cache area 108 is an area for temporarily storing data read by the drives 117 through 121. When reading of data stored in the cache area 108 (that is to say, data that has been accessed in the past) is requested from the host 1 or the host 2, the data stored in the cache area 108 is sent back to the host 1 or the host 2, which achieves speedup of input/output response. In addition, when a write request is issued from the host 1 or the host 2, data to be written is held temporarily in the cache area 108. As soon as the data is stored in the cache area 108, completion of write is reported to the host 1 or the host 2. As a result, for the host 1 or the host 2, it looks as if write operation has been performed at high speed. After that, write operation from the cache area 108 to the disk drives 117 through 121 is performed as a write processing started at regular intervals (not illustrated), and the like.

Figure 2:
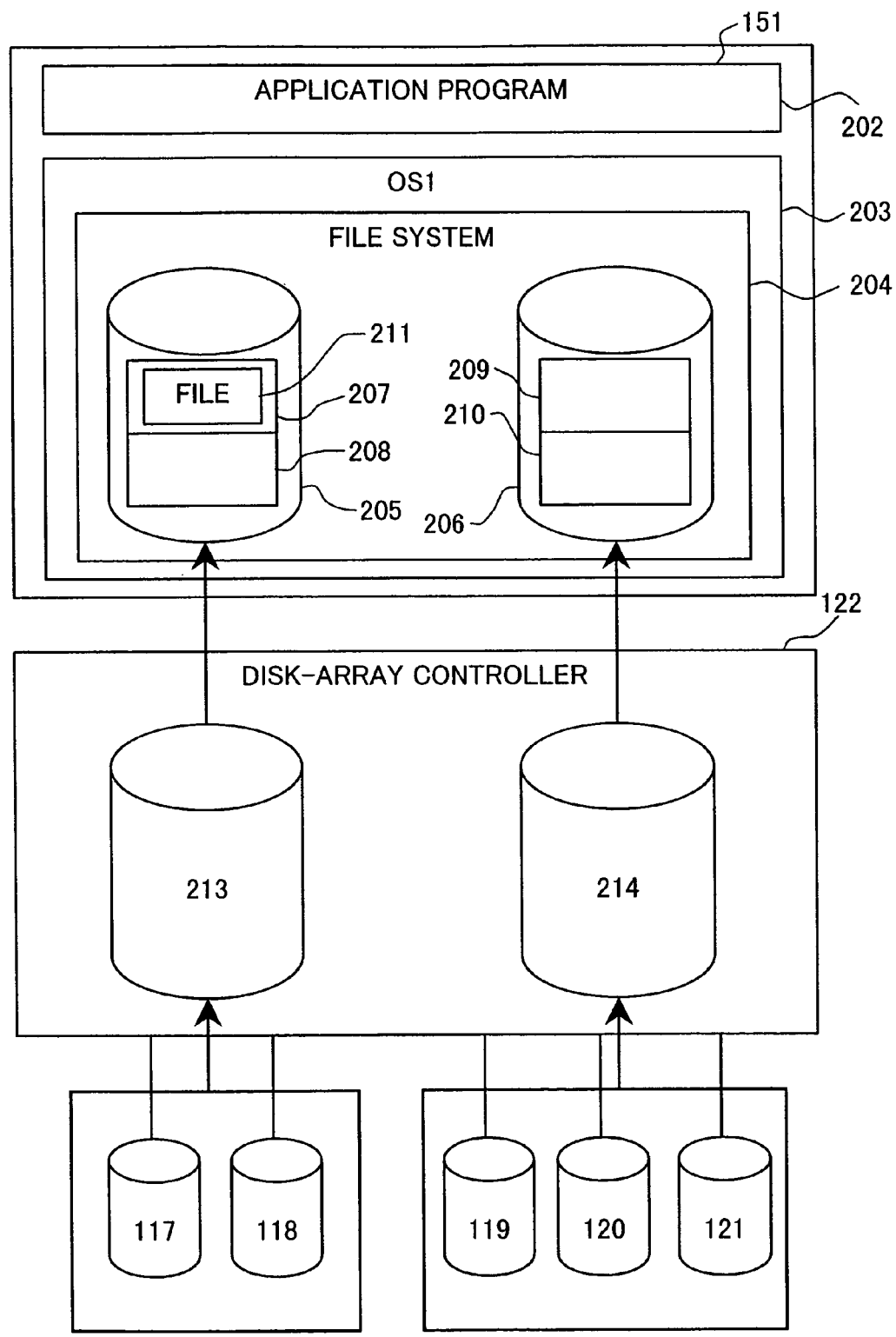
FIG. 2 is a diagram illustrating hierarchical structure of a data storage in a host 1 and a disk array controller.

FIG. 2 is a diagram for explaining how data in the disk drives 117 through 121 is managed at each hierarchy of the host 1 (151) and the disk array controller 122. By the way, the host 2 (152) can also be explained similarly using the diagram.

The disk array controller 122 can permit the host 1 to treat a plurality of physical drives as a single logical drive. For example, the disk array controller 122 permits the host 1 to treat two disk drives 117, 118 as a single logical drive 213, and in addition to it, to treat three disk drives 119, 120, 121 as a single logical drive 214. To be more specific, it looks as if not disk drives 117 through 121 as physical drives but the logical drives 213, 214 are connected to the host 151. In the following description, it is assumed that drives simply mean not physical drives (117 through 121) but logical drives (213, 214).

In the host 1, an operating system OS 1 (203), and an application program 202 for operating a file 211 are loaded. In the OS 1 (203), there is a file system 204 for managing files. The file system 204 divides the logical drive 213 into partition areas 207 and 208, and divides the logical drive 214 into partition areas 209 and 210. From the application program 202, it looks as if there are four partition areas 207, 208, 209, 210. The application program 202 creates, refers to, or updates a file for each of four partition areas 207, 208, 209, 210. FIG. 2 shows a state in which a file 211 is created in the partition area 207.

Figure 3:
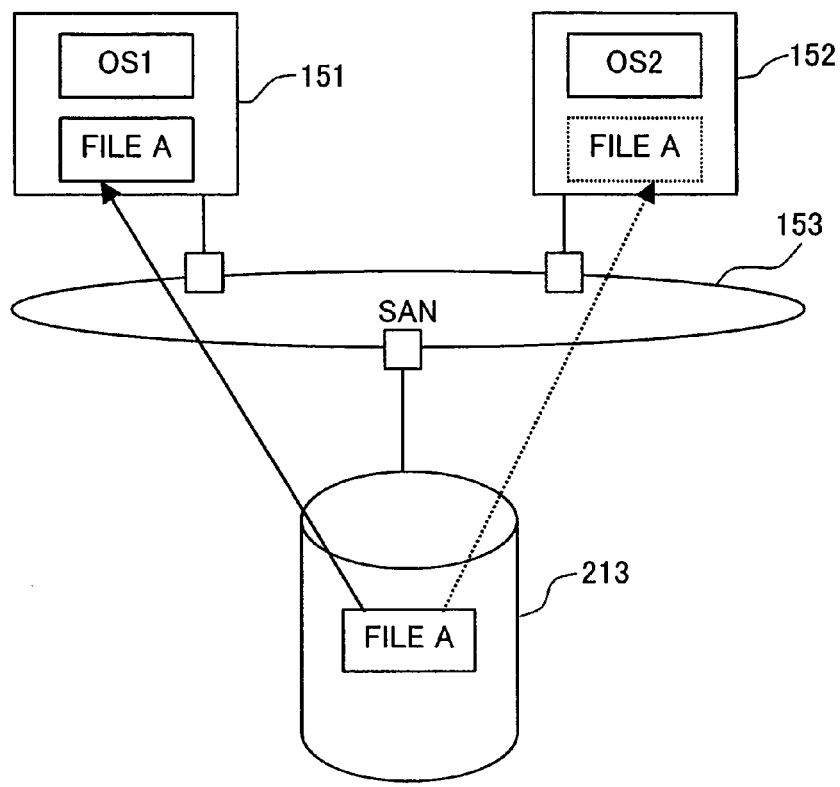
FIG. 3 is a diagram illustrating a concept of multi-platform file sharing based on different kinds of OSs.

FIG. 3 is a diagram illustrating a concept of multi-platform file sharing based on different kinds of OSs. On the host 2 (152), an OS 2, which is an operating system different from the OS 1, is in operation. In this case, a file management method of the OS 1 is different from that of the OS 2.

On the assumption that a file A created by the host 1 (151) is stored in the drive 213, the host 1 (151) can read the file A as a matter of course. However, the host 2 (152) cannot read the file A. It is because a file management method of the OS 2 is different from that of the OS 1. An object of the present invention is to permit the host 2 (152), of which a platform is different from that of the host 1 (151), to access to the file A. For this reason, as shown in FIG. 1, the present invention newly provides the disk array controller 122 with the conversion program 109 and the host table 110. As a result, when accessing the file A from the host 2, a format of the file A is converted into a format of the OS 2, which permits the host 152 to read the file A.

File management methods of the OS 1 and the OS 2 in this embodiment will be described with reference to FIGS. 4 through 9.

Figure 4:
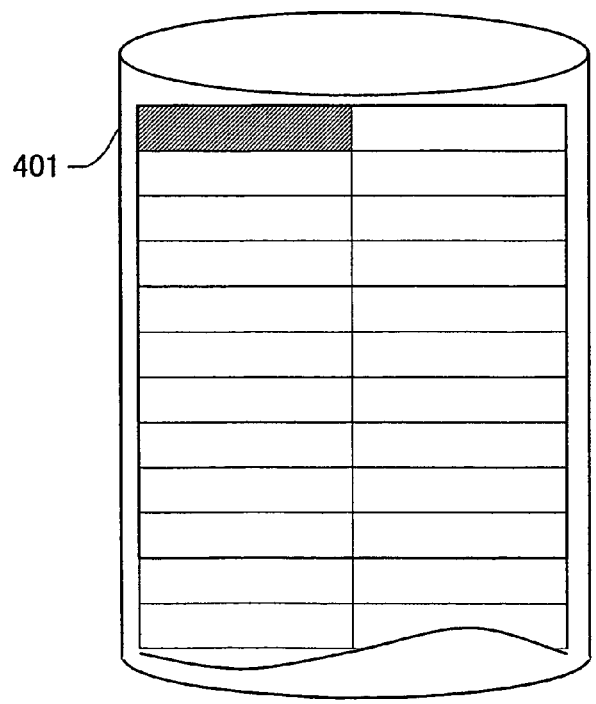
FIG. 4 is a diagram illustrating a disk area management method of a file system of a first OS.

FIG. 4 is a diagram illustrating a disk area management method of the file system 204 of the OS 1. The file system of the OS 1 divides a drive area into a plurality of fixed-length blocks 401 for management. When a data length of a file is longer than the fixed-length block 401, the file system divides the file into a plurality of blocks and stores the blocks. In this case, these blocks may not always be allocated to consecutive areas. Therefore, the file system is required to manage locations of the disk areas where the file is allocated. Information indicating the locations is called file management information. Each of two areas, which are illustrated by bold lines, indicates a partition area.

Figure 5:
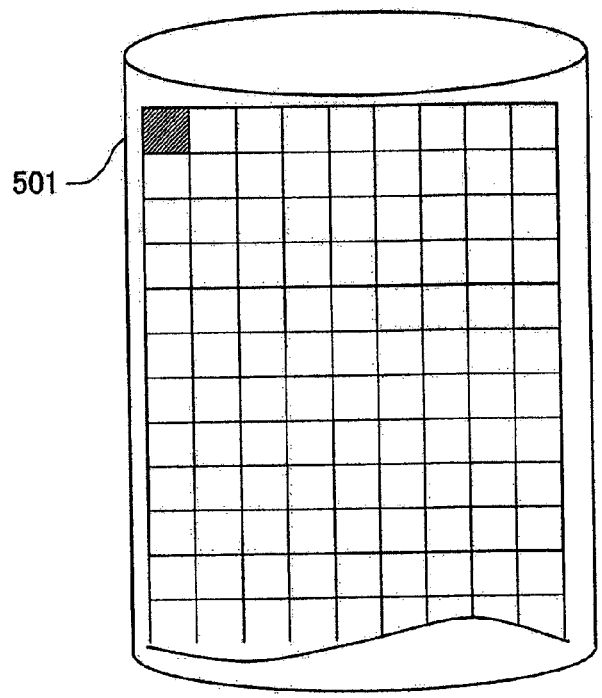
FIG. 5 is a diagram illustrating a disk area management method of a file system of a second OS.

FIG. 5 is a diagram illustrating a disk area management method of a file system of the OS 2. The file system of the OS 2 divides a drive area into a plurality of fixed-length blocks 501 for management. When a data length of a file is longer than the fixed-length block 501, the file system divides the file into a plurality of blocks and stores the blocks. In this case, these blocks may not always be allocated to consecutive areas. If a data length of a file is longer than the fixed-length block 501, the file system divides the file into a plurality of blocks and stores the blocks. In this case, these blocks may not always be allocated to consecutive areas. Therefore, the file system is required to manage locations of the disk areas where the file is allocated. File management information of the OS 1 is different from that of the OS 2. Moreover, this embodiment is based on the assumption that a block length of the fixed-length block 401 is four times as long as that of the fixed-length block 501. It is to be noted that each of two areas, which are illustrated by bold lines, indicates a partition area.

Figure 6:
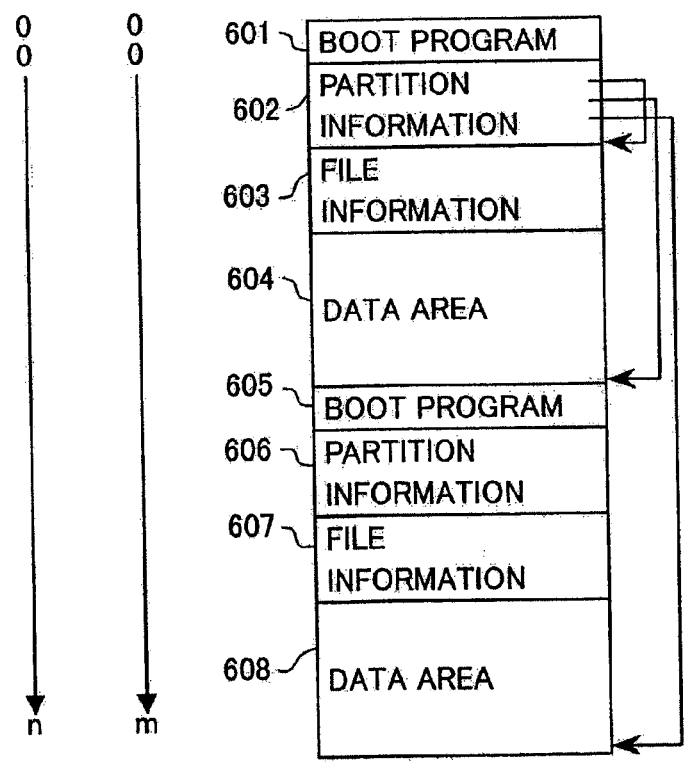
FIG. 6 is a diagram illustrating management structure of the first OS.

FIG. 6 is a diagram illustrating management structure of the file system of the OS 1. Reference numerals 601 through 604 are first partition areas; and reference numerals 605 through 608 are second partition areas. In an area denoted by reference numeral 601, a boot program is stored. The boot program is a program executed first when a host is started up. Partition information is stored in an area shown by 602, where information such as a first block of each partition is held. In an area shown by 603, information about files, which are stored in a data area 604, is stored. The reference numeral 604 is the data area where files created by an application program are stored. The second partition areas are also configured in a manner similar to the first partition areas. In an area denoted by 606 of the second partition area, the same data as partition information, which is stored in the area 602, is stored. This is because partition information is important for managing a whole drive. If the first partition information 602 cannot be read as a result of failure, etc., the second partition information 606 is used to continue processing.

Figures 7, 9:
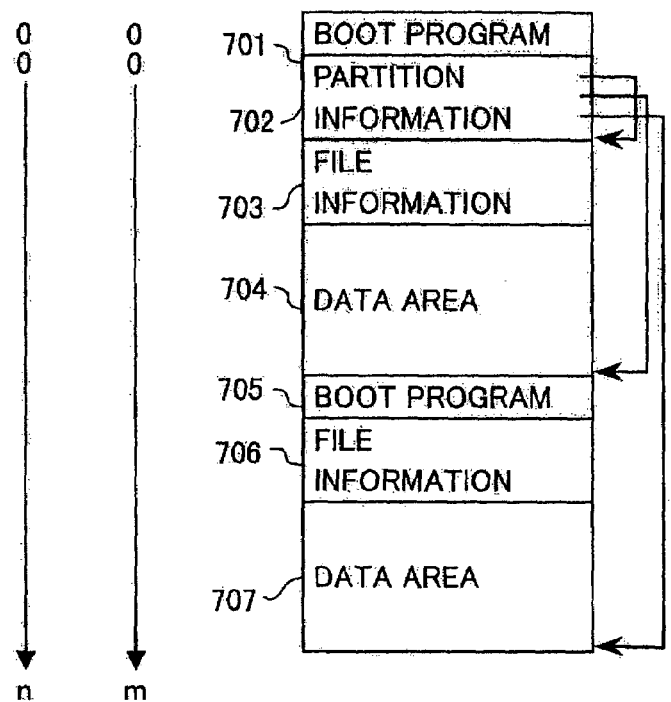
FIG. 7 is a diagram illustrating management structure of the second OS.
FIG. 9 is a diagram illustrating a configuration of a host table.

FIG. 7 is a diagram illustrating management structure of the file system of the OS 2. Reference numerals 701 through 704 are first partition areas; and reference numerals 705 through 707 are second partition areas. A boot program, contents of partition information and file information, and a role of a data area are the same as those described in FIG. 6. In contrast to FIG. 6, partition information is not stored in the second partition area in FIG. 7.

Figure 8:
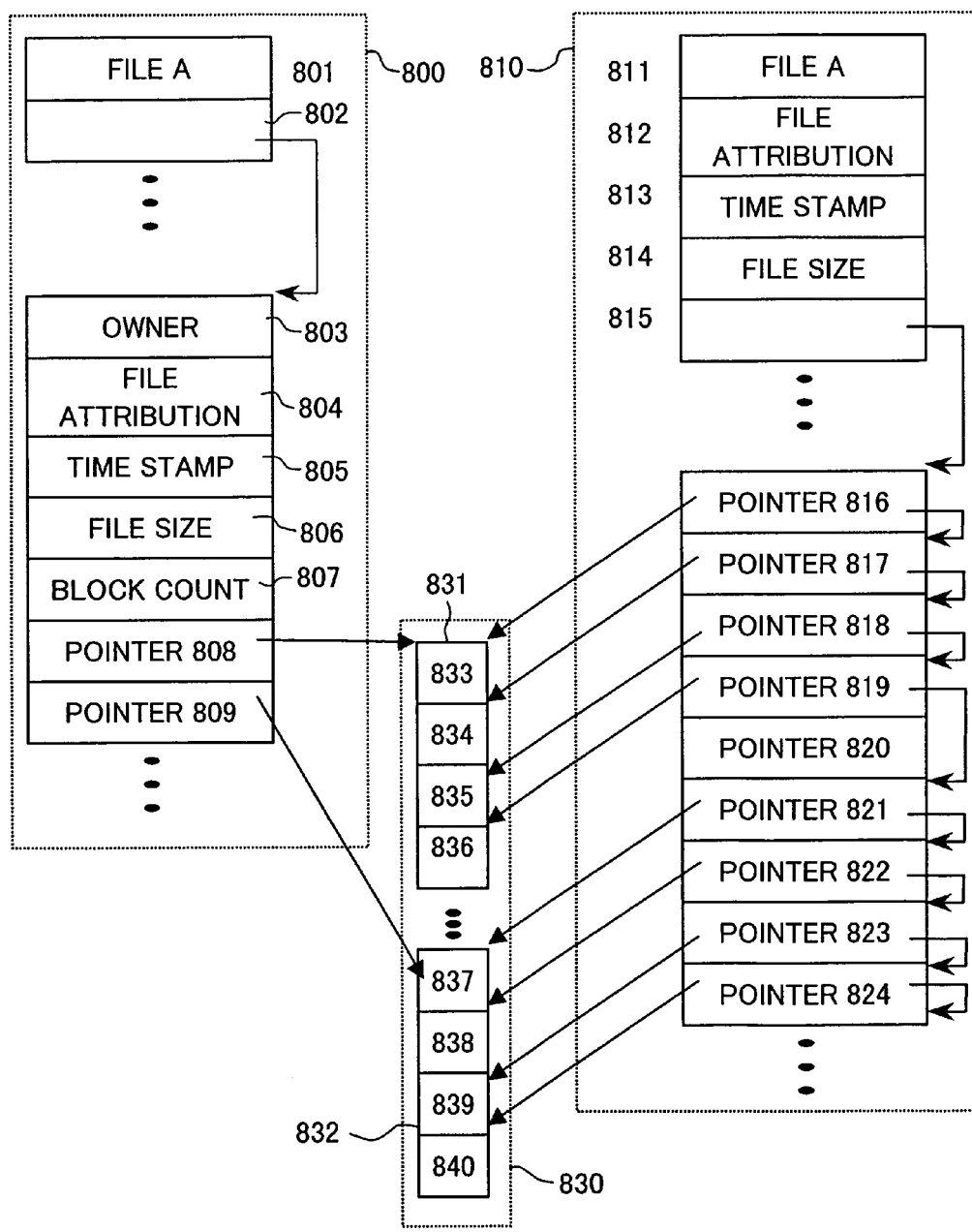
FIG. 8 is a diagram illustrating a method for sharing files between the file system of the first OS and the file system of the second OS.

FIG. 8 is a diagram illustrating a method for sharing a file between the file system of the OS 1 and the file system of the OS 2.

Reference numeral 800 shows contents of the file management information 603 (or 607) of the OS 1. Reference numeral 801 is an area in which a file name is stored. In this embodiment, a file name "file A" is stored. In reference numeral 802, information indicating a first block of an area, in which file management information about the file A is stored, is stored. The file management information about the file A comprises: an owner area 803 for storing a file owner; a file attribute area 804 for storing information indicating file access permitted/not permitted; a time stamp area 805 for storing a file update date; a file size area 806 for storing a file size; a block count area 807 indicating the number of blocks of a file; and pointers (808, 809, . . . ) that point to disk areas in which data of the file A is stored.

Reference numeral 810 shows contents of the file management information 703 (or 706) of the OS 2. Reference numeral 811 is an area in which a file name is stored. In this embodiment, a file name "file A" is stored. Following the area 811, file management information about the file A is stored. The file management information of the file A comprises: a file attribute area 812 for storing information about file access permitted/not permitted; a time stamp area 813 for storing file update date; a file size area 814 for storing a file size; a pointer area 815 indicating an area in which data of the file A is stored; and pointers 816 through 824 that point to disk areas in which the file A is stored.

Reference numerals 831 and 832 are data blocks, which are pointed to by the pointers 808 and 809 respectively. Block lengths of these data blocks are the same as the block length of the block 401. In addition, reference numerals 833 through 840 are data blocks, which are pointed to by the pointers 816 through 824 respectively. Block lengths of these data blocks are the same as the block length of the block 501. Reference numeral 830 is a whole data of the file A. As described above, the block length of the block 401, which is a unit of management by which the file system of the OS 1 manages disk areas, is four times as long as the block length of the block 501 of the OS 2. Therefore, the number of pointers used by the OS 2 for managing data of the file A is four times as many as that used by the OS 1. For example, if the file A is created by an application program on the OS 1, a block length, that is to say, a unit of management for data areas must be changed in order to permit the OS 2 to recognize the file A. In order to permit the OS 2 to recognize the file A that has been created by an application program on the OS 1, a processing, which converts the contents 800 of the file management information of the OS 1 into the contents 810 of the file management information of the OS 2, is required. The processing will be described later.

FIG. 9 is a diagram illustrating a configuration of a host table 110. A host ID is an ID of each host that accesses a disk array controller. In this embodiment, as shown in FIG. 1, because the host 1 and the host 2 are connected to the disk array controller 121, host IDs 01, 02 are assigned to the hosts respectively. When a host issues an input/output request to a disk array controller, a host ID is an identifier that is transmitted from the host to the disk array controller, and that is transferred together with the input/output request. In "type of file system", a type of a file system operating in each host is stored. In "type of target file system", a type of a file system, which creates a file stored in a storage system, is stored. As regards the host 1 (host ID 01), file systems, which are described in the column of "type of file system" and in the column of "type of target file system" are the same. This means that a file system for creating a file is the same as a file system by which input/output processing is desired. Therefore, the host 1 can access data in the storage system. On the other hand, as regards the host 2 (host ID 02), a file system described in the column of "type of file system" is different from that described in the column of "type of target file system". This means that a file system for creating a file is different from a file system by which input/output processing is desired. In the prior art, the OS 2 cannot access data in the storage system. A unit of management indicates a unit of management of a file system. For example, a unit of management of the OS 1 file system, that is to say, a data length of the block 401 is 4096 bytes; and a unit of management of the OS 2 file system, that is, a data length of the block 501 is 1024 bytes. There are several methods for setting the host ID, the type of file system, the type of target file system, and the unit of management. For example, although not illustrated, there are the following methods: a method in which a user sets them from a console of the disk array controller; a method in which a special command is issued to the disk array controller from the host to transfer information about the host and to set them; a method in which the disk array controller judges from access procedures of the file system automatically to set them; and the like.

Figure 10:
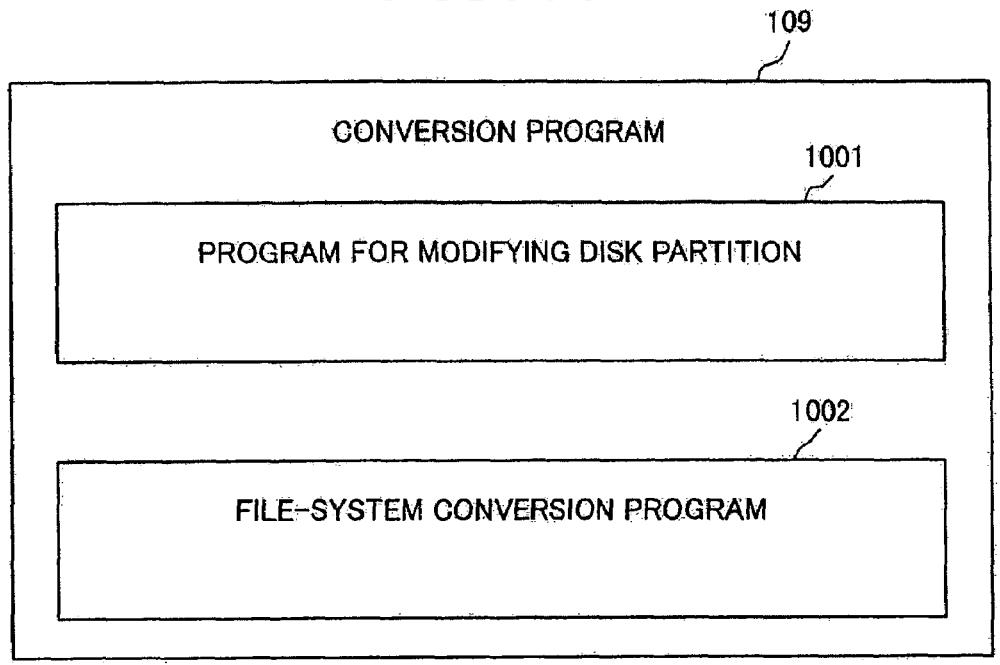
FIG. 10 illustrates a configuration of a conversion program.

FIG. 10 shows a configuration of the conversion program 109. The conversion program 109 comprises a partition conversion program 1001 and a file system conversion program 1002.

Figure 11:
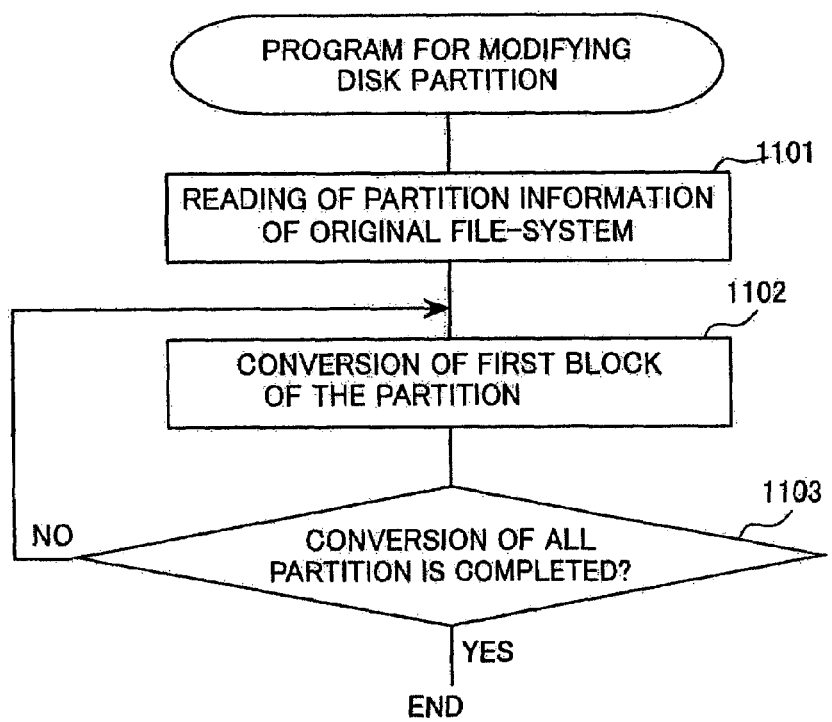
FIG. 11 illustrates a configuration of a partition conversion program.

FIG. 11 shows a flowchart of the partition conversion program 1001. The partition conversion program 1001 converts disk management structure of the OS 1 into disk management structure of the OS 2. The partition conversion program 1001 is a program used for permitting the file system of the OS 2 to recognize a partition that exists in the file system of the OS 1.

For example, the partition conversion program 1001 is started in the following cases: when power of a disk device is turned on; at the time of a user's instruction; in a case where there is an access from a host of a different kind (a host on which a different file system operates) for the first time; or the like. As regards judgment whether or not an input/output request is issued from a host of a different kind, the "type of target file system" and the "type of file system" in the host table in FIG. 10 are compared. If they are not the same, the input/output request is judged to be an access from a host of a different kind.

Figure 13:
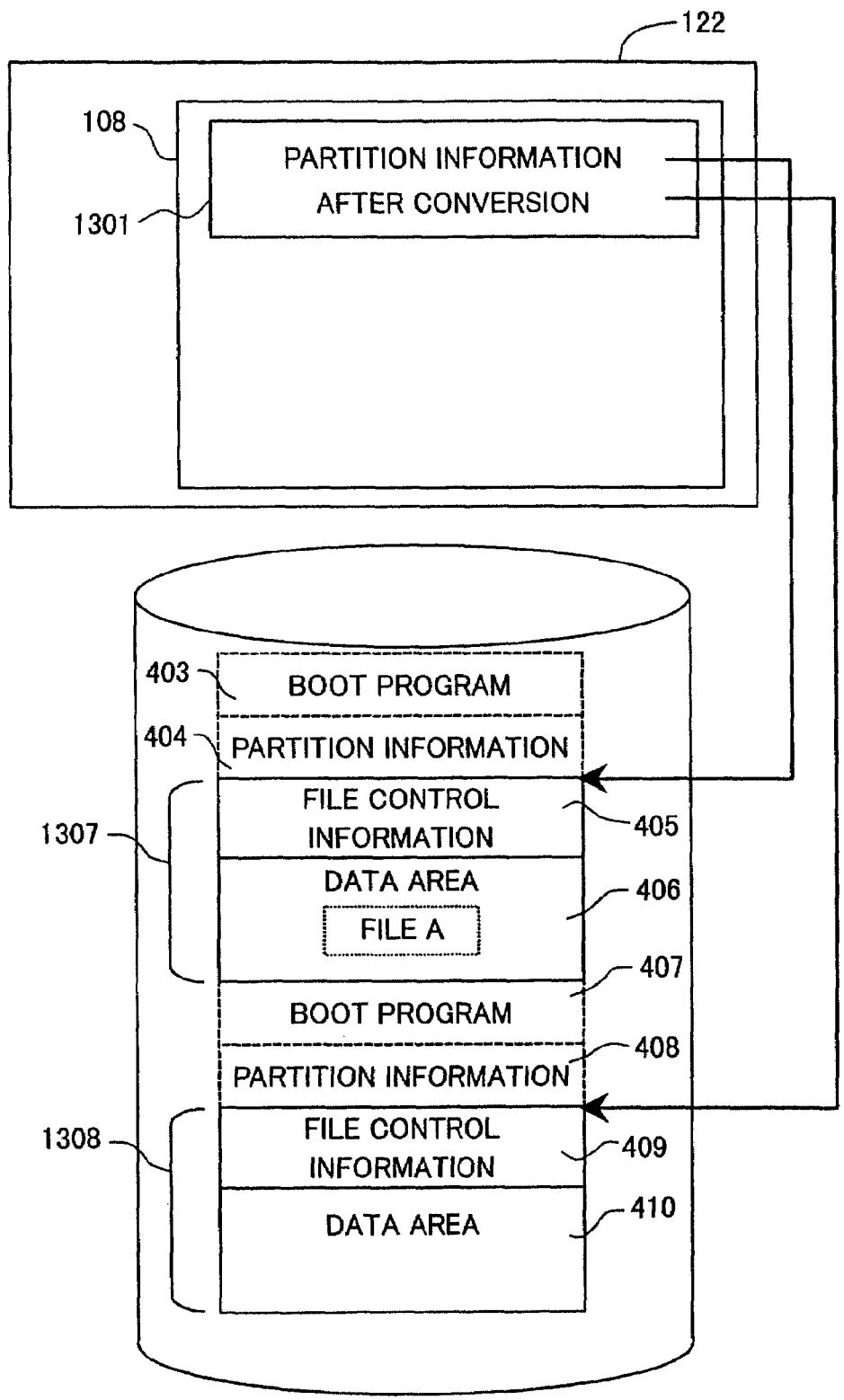
FIG. 13 is a diagram illustrating a result of conversion by the partition conversion program.

In a step 1101, partition information of an original file system is read. In this embodiment, partition information of the file system of the OS 1 is read. In a step 1102, a block number of a first block of a partition is converted. A unit of disk management of the OS 1 is different from that of the OS 2. Therefore, when a top of a partition is described using a block number, the same disk address corresponds to a different block number. This is the reason why the block number is converted. In a step 1103, a partition size is converted. It is also the processing performed for the same reason as the step 1102. When a partition size is described using the number of blocks, and when units of management are different, the same partition capacity is not equivalent to the same number of blocks. This is the reason why the partition size is converted. In a step 1103, whether or not all partitions have been converted is judged. If there is a partition that has not been converted yet, a process returns to the step 1102. A result of the partition conversion (hereinafter referred to as "partition information after conversion") is stored in, for example, the cache area 108 in the disk array controller 122 as shown in FIG. 13. If the partition information after conversion 1301 is accessed, it is possible to recognize a partition 1 (1307) and a partition 2 (1308) in the file system of the OS 1 even from a different file system.

Figure 12:
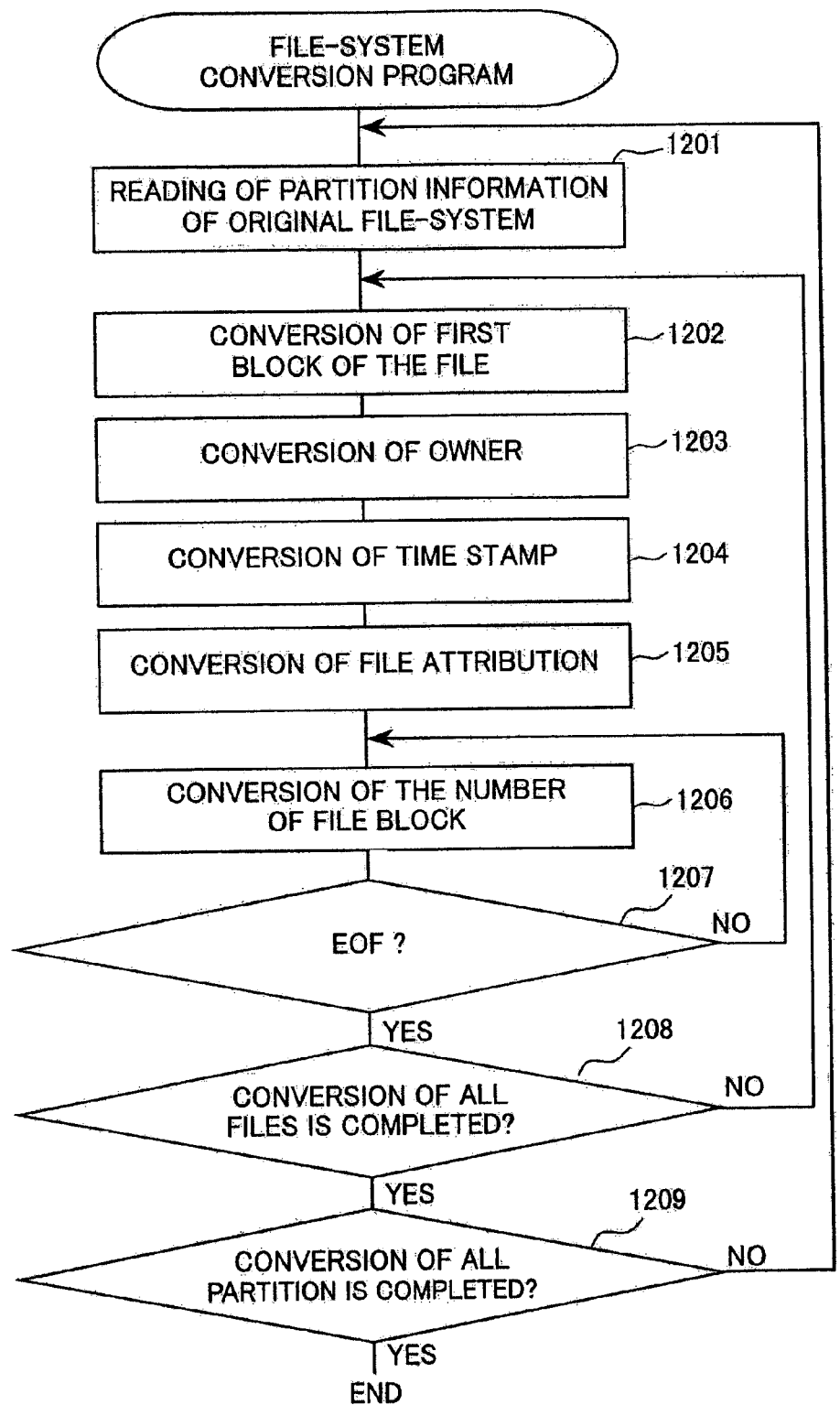
FIG. 12 illustrates a configuration of a file system conversion program.

FIG. 12 illustrates a flowchart of the file system conversion program 1002. Only execution of the partition conversion program 1001 does not permit a different file system to access a file. It is because a format of file management information (405, 409) of the OS 1 is different from that of the OS 2. Therefore, the file system conversion program converts the file management information. The file system conversion program is started, for example, when there is an access from a host of a different file system. As regards judgment whether or not an input/output request is issued from a host of a different kind, the host table shown in FIG. 9 is used as described above.

The file system conversion program 1002 will be described while dividing its operation into steps. In a step 1201, file management information of an original file system is read. In this embodiment, file management information of the file system of the OS 1 is read. In a step 1202, a block number of a first block of a file is converted. This means that information of the reference numeral 802 in FIG. 8 is converted into information of the reference numeral 815 in FIG. 8. This is based on the same reason as that of the step 1102 described in FIG. 11. In a step 1203, an owner of the file is converted. In this case, if use of a specific owner as a file owner after conversion is desired because of file protection, or the like, an owner after conversion is instructed beforehand. In addition, depending on a format of a file system, there is a case where no owner exists. In such a case, this step is omitted. In a step 1204, a time stamp of a file is converted. This means that data of the reference numeral 805 in FIG. 8 is converted into a data format of the reference numeral 813 in FIG. 8. In a step 1205, a file attribute is converted. This shows that data of the reference numeral 804 in FIG. 8 is converted into a data format of the reference numeral 812 in FIG. 8. In this case, writing a write-protect attribute to a file attribute after conversion can configure file systems as follows: an original file system can update the file whereas a different file system cannot update it. In a step 1206, a block number of a block, in which data of a file is stored, is converted. This shows that it is converted into a data format of the reference numerals 816, 817, . . . shown in FIG. 8. In this case, a pointer pointing to a data area is converted so as to point to a data area that is stored by the file system of the OS 1. This permits a plurality of hosts to refer to the same data. In this embodiment, a unit of disk management of the OS 1 is four times as large as that of the OS 2. Because of it, by processing of a step 1206, data, which is pointed to by the pointers 808 and 809, is converted into data stored in eight areas, which are pointed to by the pointers 816 through 819 and the pointers 821 through 824. In a step 1207, an end of a file is judged. If conversion of one file is not completed, the step 1206 is repeated. In a step 1208, whether all file information in a partition has been converted or not is judged. In a step 1209, whether all file information in all partitions in a drive has been converted or not is judged. As a result of the processing described above, the conversion of the file information to the different file system is completed.

Figure 14:
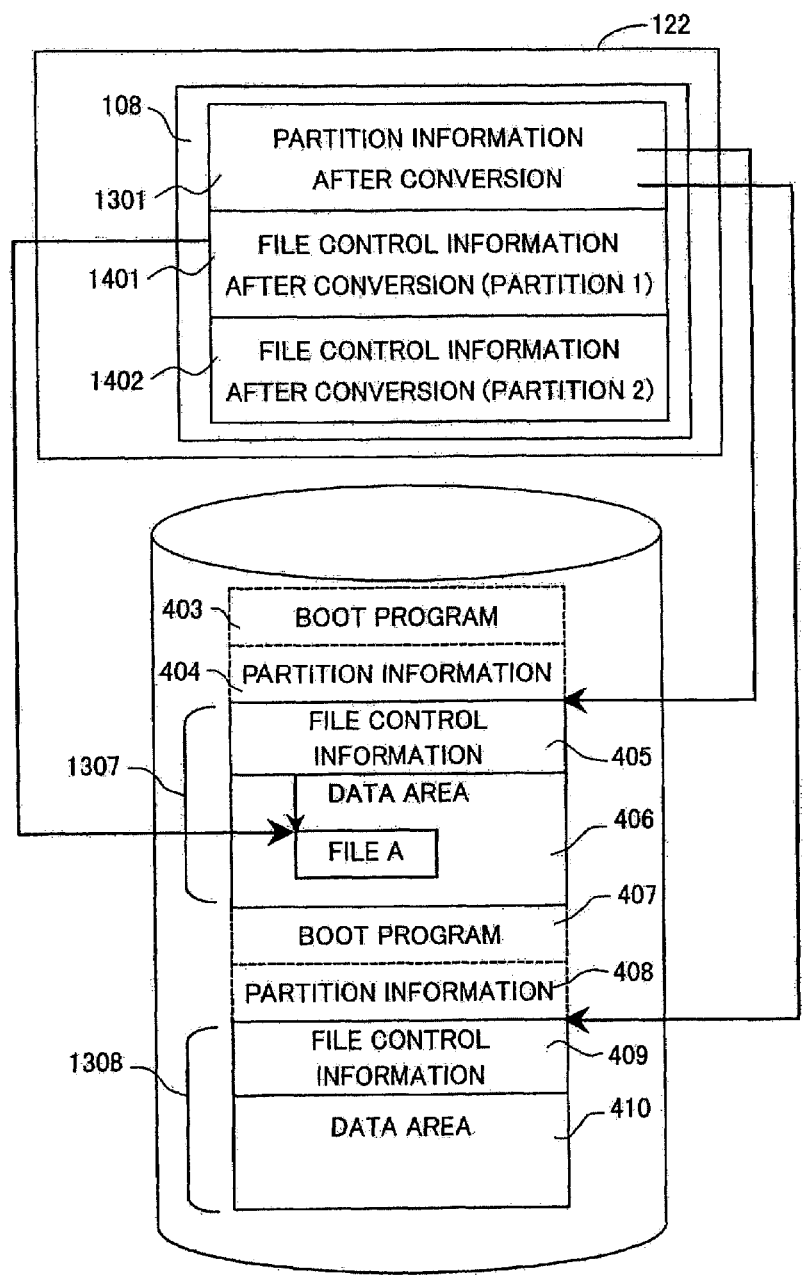
FIG. 14 is a diagram illustrating a result of conversion by the file system conversion program.

In FIG. 14, a conversion result of file management information after executing the file system conversion program 1002 is stored in the cache area 108 as file management information after conversion (1401, 1402). A reference number 1402 is a result of conversion of file information existing in the partition 1 (1307); and a reference number 1402 is a result of conversion of file information existing in the partition 2 (1308). Using the partition information after conversion 1301, which has been converted by the partition conversion program 1001, and the file management information after conversion (1401, 1402), which has been converted by the file system conversion program 1002, the OS 2 can recognize the file A in the partition 1.

It is to be noted that although the conversion program supports only one kind of OS (or file system) in this embodiment, adding a plurality of conversion programs permits a plurality of file systems to be supported. More specifically, information is added to the host table 110. As a result, if a file system is changed, and even if a management format is changed due to version upgrade of the file system, changing the conversion program 109 from a console of the disk array controller 122 or from the host enables easy support.

Figure 15:
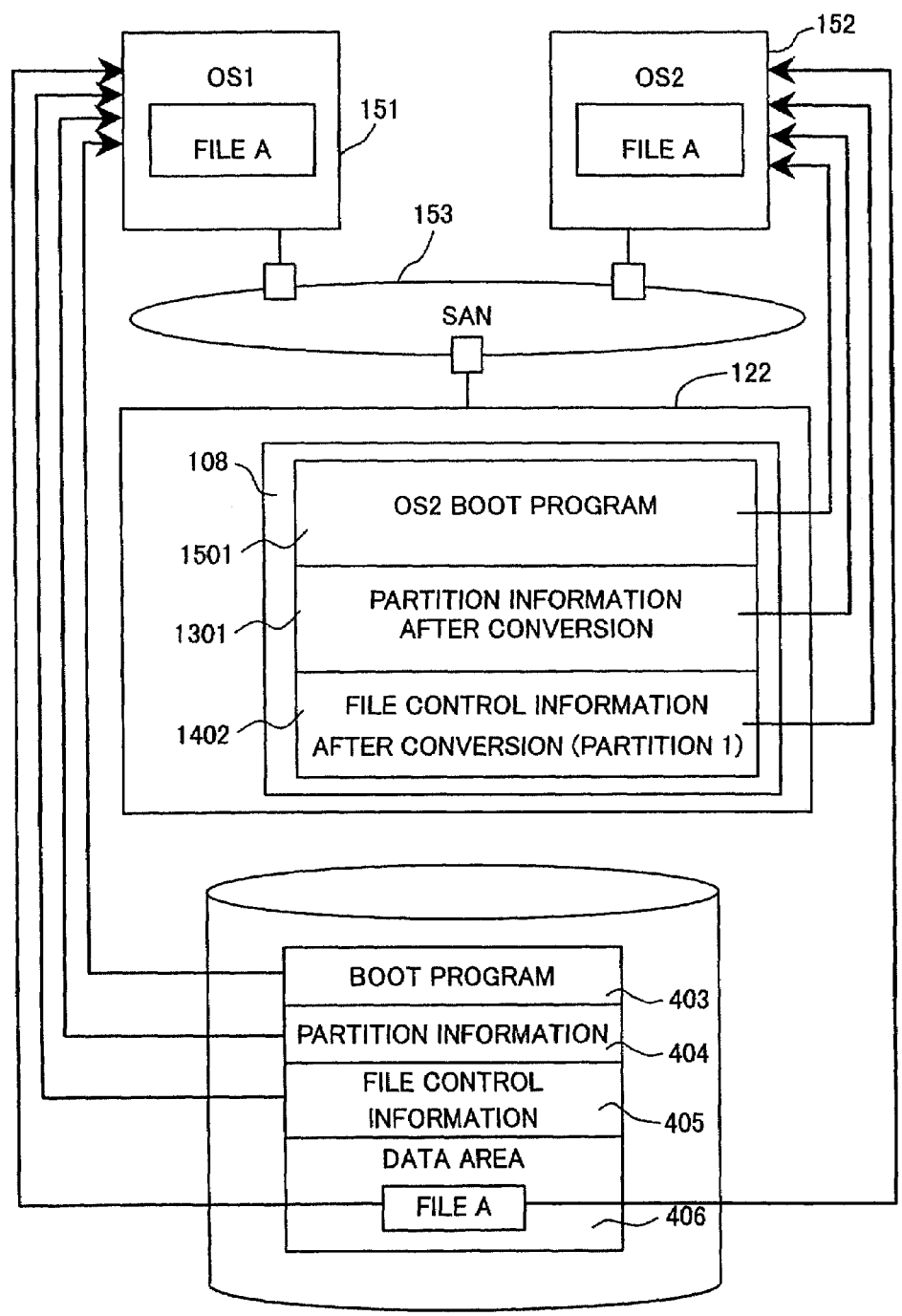
FIG. 15 is a diagram illustrating operation of a disk system after executing the conversion program.

FIG. 15 is a diagram illustrating operation of a storage system after executing the conversion program 109. In this embodiment, an OS 2 boot program 1501 is stored in the cache area 108 in the disk array controller 122. When accessing a boot program, partition information, and file management information, the host 1 accesses an OS 1 boot program 403, a partition information 404, and the file management information 405, each of which is stored in the disk unit. On the other hand, when accessing a boot program, partition information, and file management information, the OS 2 accesses the OS 2 boot program 1501, the partition information 1301, and the file management information 1401, each of which is stored in the cache area 108. However, both of the host 1 and the host 2 can access the file A in the data area 406 to view its contents. In other words, when accessing data peculiar to the file system such as a boot program, partition information, file management information, from each host, an area peculiar to a file system of each host is accessed. As a result, data, which is sent back, is also different. On the other hand, a file in data area can be viewed from each of the hosts.

Figure 16:
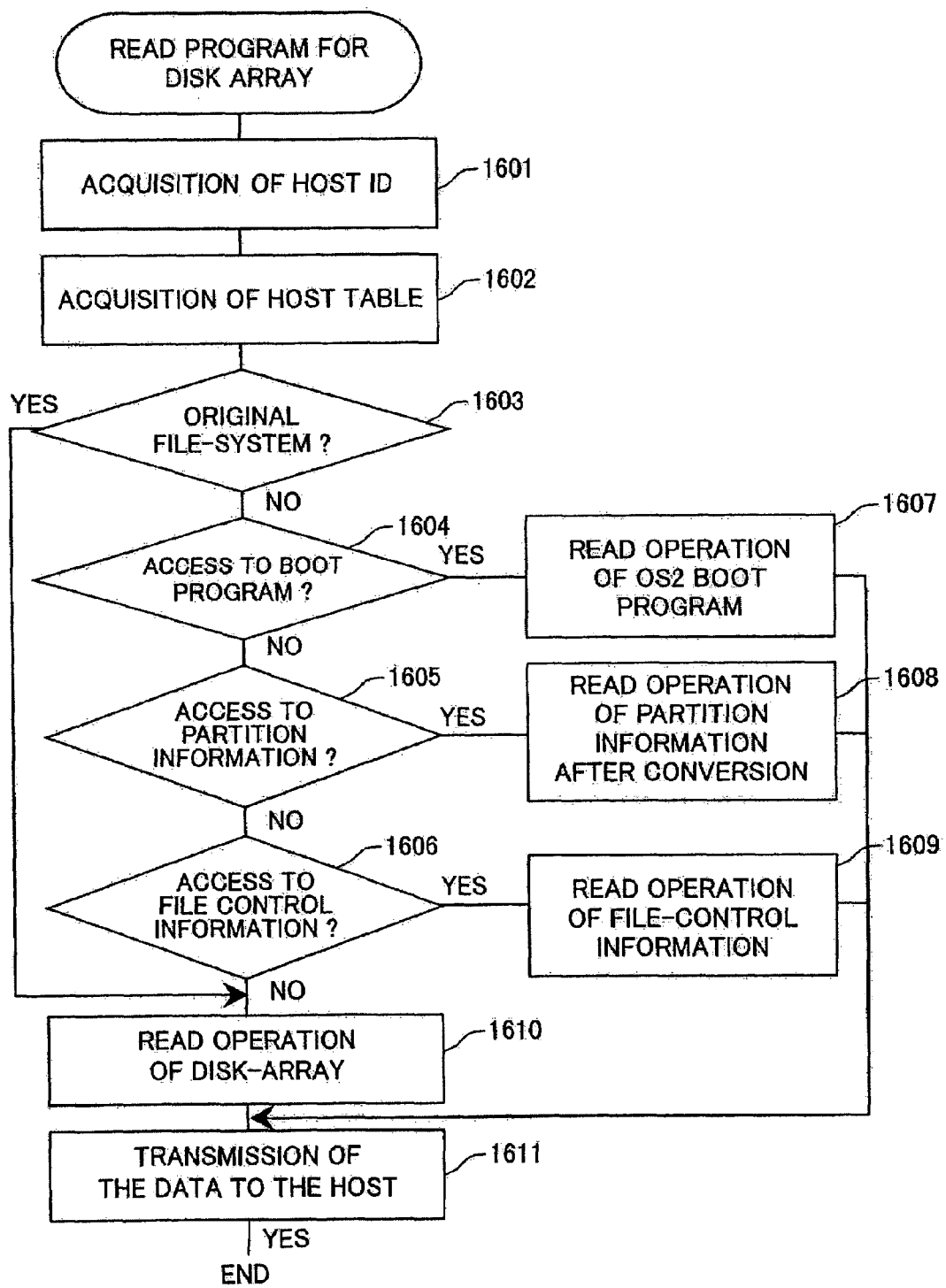
FIG. 16 illustrates a flow of a disk-array read program.

FIG. 16 illustrates a flow of the disk-array read program 106. In a step 1601, a host ID of a host, which has issued an access request, is obtained. In a step 1602, a "type of file system", a "type of target file system", and a "unit of management", which correspond to the obtained host ID, are obtained from the host table 110. In a step 1603, whether or not it is an original file system of the host, which has issued an access request, is judged. If it is the original file system, a process proceeds to a step 1610. If not, the process proceeds to a step 1604. In this embodiment, if it is an access from the host 1, the process proceeds to "YES"; or if it is an access from the host 2, the process proceeds to "NO". Steps 1604 through 1609 are executed when there is a request from a file system, which is different from the file system that has stored the file in the disk device. In a step 1604, whether or not it is an access to a boot program is judged. If it is the access to the boot program, the process proceeds to a step 1607. If not, the process proceeds to a step 1605. In the step 1607, a boot program corresponding to the file system after conversion is read. In the step 1605, whether or not it is an access to partition information is judged. If it is the access to the partition information, the process proceeds to a step 1608. If not, the process proceeds to a step 1606. In the step 1608, the partition information after conversion is read. In a step 1606, whether or not it is an access to file management information is judged. If it is the access to the file management information, the process proceeds to a step 1609. If not, the process proceeds to a step 1610. In the step 1609, the file management information after conversion is read. In the step 1610, usual disk-array read processing is performed, and data corresponding to a requested disk address is read. In a step 1611, read data are transferred to the host. By executing these steps, a file read request from a plurality of hosts, on which different OSs operate, can be processed.

As described above, according to this embodiment, the file can be shared among a plurality of different file systems. In addition, because management information of the converted file system is allocated to the cache area 108, capacity of the disk drives is not influenced. It is to be noted that all files on the disk may be converted, or that only a specific file may also be converted. Moreover, it is also easy to treat files in different partitions so that they look as if they exist in one partition as a result of conversion.

Embodiment 2

Figure 17:
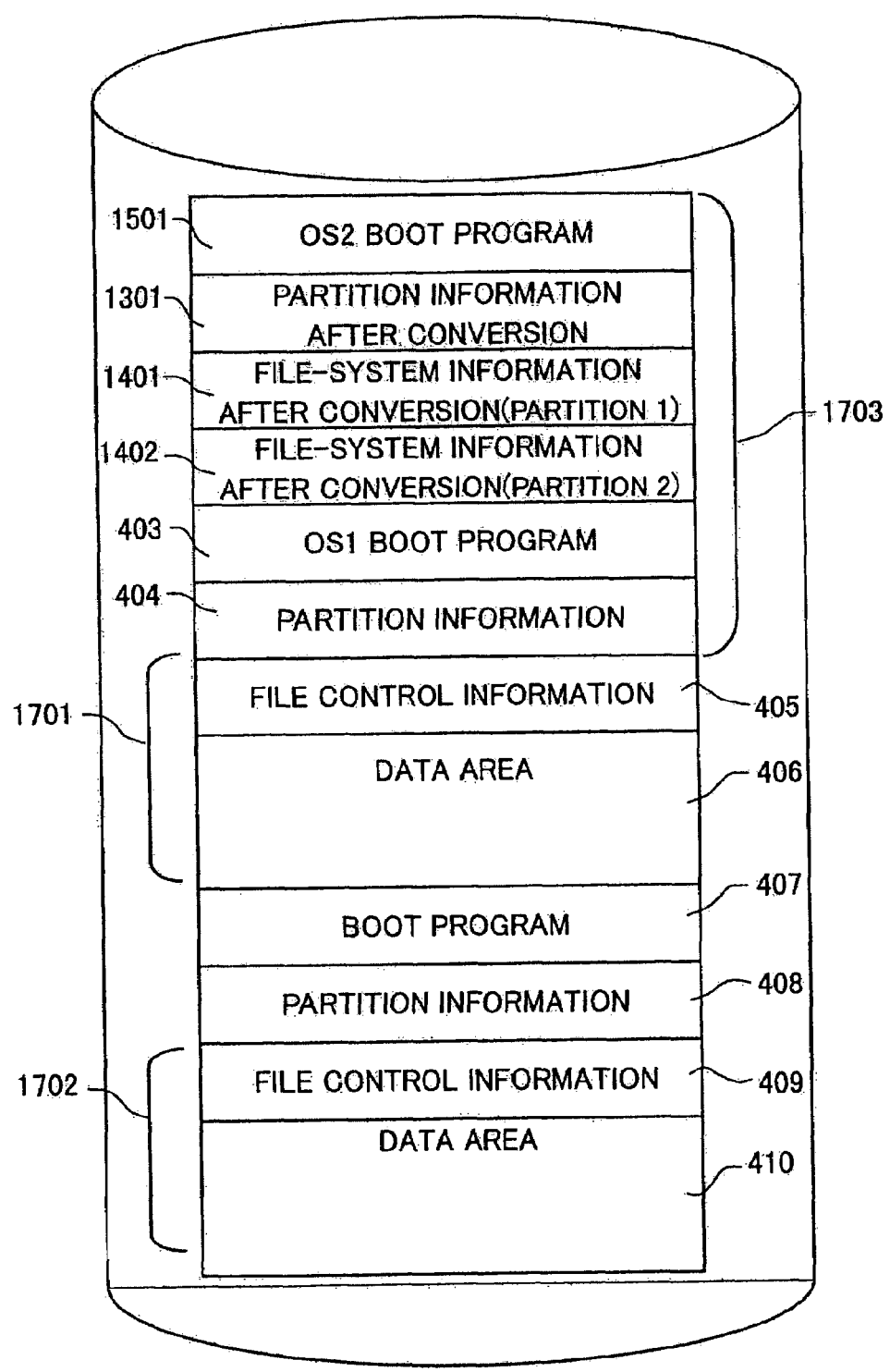
FIG. 17 is a diagram illustrating a data storing format on a disk in an embodiment 2 according to the present invention.

FIG. 17 is a diagram illustrating a data storing format on a disk in the embodiment 2 according to the present invention. In the embodiment 1, the partition information after conversion 1301, the file management information after conversion 1401, 1402, and the OS 2 boot program 1501 are stored in the cache area 108. In general, the cache area 108 is backed up using a battery. Therefore, even when the disk array controller 122 is powered off, contents will not be lost immediately. However, it is not suitable for long-time saving. The partition information after conversion 1301 and the file management information after conversion 1401, 1402 can be recovered from data of the file system of the OS 1. However, because recovery of the data requires time, it is desirable to save information permanently once the information is converted. For this reason, in the embodiment 2, as shown in FIG. 17, converted data is stored in disk drives instead of the cache area 108. In the disk drives, the boot program 403, the partition information 404, the file management information 405, 406, which relate to an original file system (in this embodiment, the file system of the OS 1), the OS 2 boot program 1501, the partition information after conversion 1301, and the file management information after conversion 1401, 1402 are stored.

Figure 18:
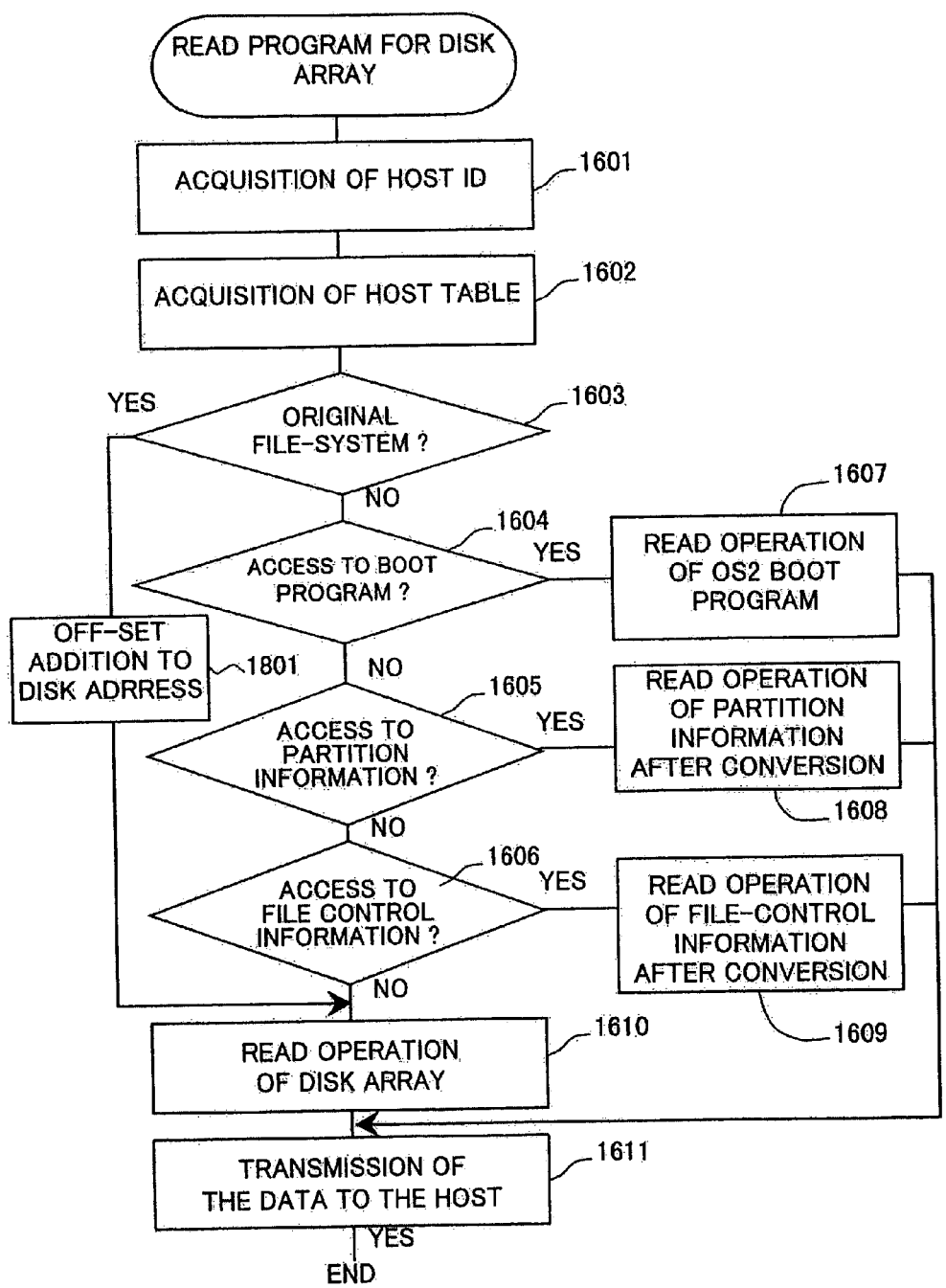
FIG. 18 illustrates a flow of a disk-array read program of the embodiment 2 according to the present invention.

FIG. 18 illustrates a flow of a disk-array read program of the embodiment 2. As regards steps that are common to those in the flow described in FIG. 16, description will be omitted. Only steps, which are different from those in the flow in FIG. 16, will be described. In the flow described in FIG. 18, a step 1801 is added. To be more specific, if a file system of a host, which has issued an access request, is an original file system, an offset 1703 (refer to FIG. 17) is added to a disk address. This is because the OS 2 boot program 1501, the partition information after conversion 1301, and the file management information after conversion 1401, 1402 are stored in the disk drives. Adding an offset to a disk address, to which a host requests an access, enables an access to correct data.

It is to be noted that even when the OS 2 boot program 1501, the partition information after conversion 1301, and the file management information after conversion 1401, 1402 are stored in the disk drives, frequently accessed data is loaded into the cache area 108, which enables acquiring the same read performance as that in the embodiment 1. Moreover, in the embodiment 2, although the OS 2 boot program 1501, the partition information after conversion 1301, and the file management information after conversion 1401, 1402 are allocated to specific areas in the disk drives, the allocation of the data can be changed freely. Therefore, even if an OS of a host connected to a storage system is changed, or a new host is additionally connected, allocating the boot program, the partition information after conversion, and the file management information after conversion to space areas managed by the original file system enables such changes without changing disk-area structure of the original file system.

Embodiment 3

Figure 19:
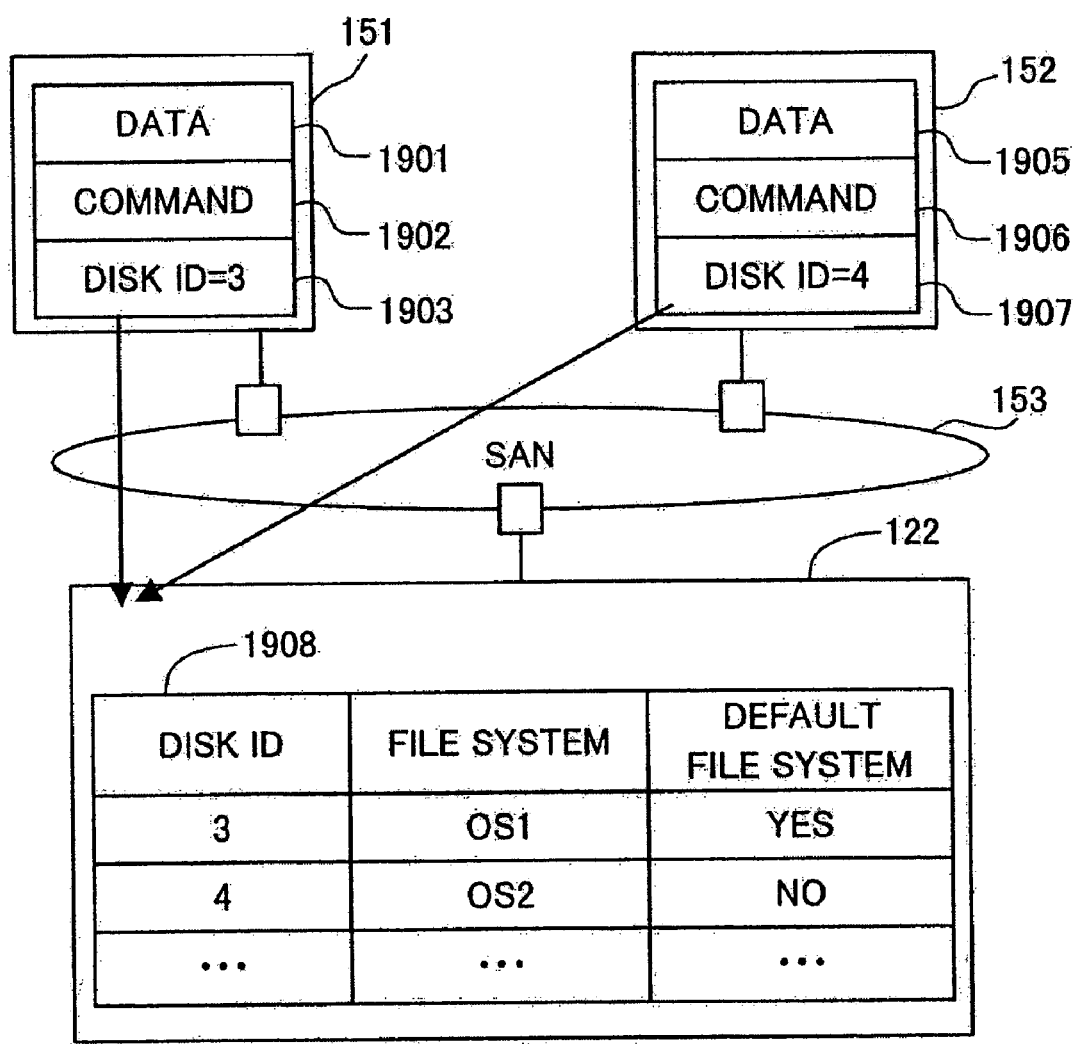
FIG. 19 is a diagram illustrating a data sharing method of an embodiment 3 according to the present invention.

An object of an embodiment 3 is to share a disk without using the host table 110 used in the embodiment 1. FIG. 19 is a diagram illustrating a data sharing method of the embodiment 3. The host 1 (151) and the host 2 (152) specify different disk IDs (1903, 1907) for the disk array controller 122 through the SAN 153, and transfer commands (1902, 1906) and data (1901, 1905). In FIG. 19, the following example is shown: the host 1 specifies a disk ID=3; and the host 2 specifies a disk ID=4. The disk array controller 122 is characterized by the following: if the disk array controller 122 is accessed with a specified disk ID=3, the disk array controller 122 performs a usual disk input/output; and if the disk array controller 122 is accessed with a specified disk ID=4, the disk array controller 122 performs input/output processing by utilizing the partition information after conversion 1301, the file management information after conversion 1401, 1402 shown in FIG. 15 of the embodiment 1. More specifically, this means that the disk ID=3 is used only for the OS 1 (default file system) operating in the host 1, and that the disk ID=4 is used only for the OS 2 operating in the host 2. A control method for each kind of OS is described in a disk control table 1908.

Figure 20:
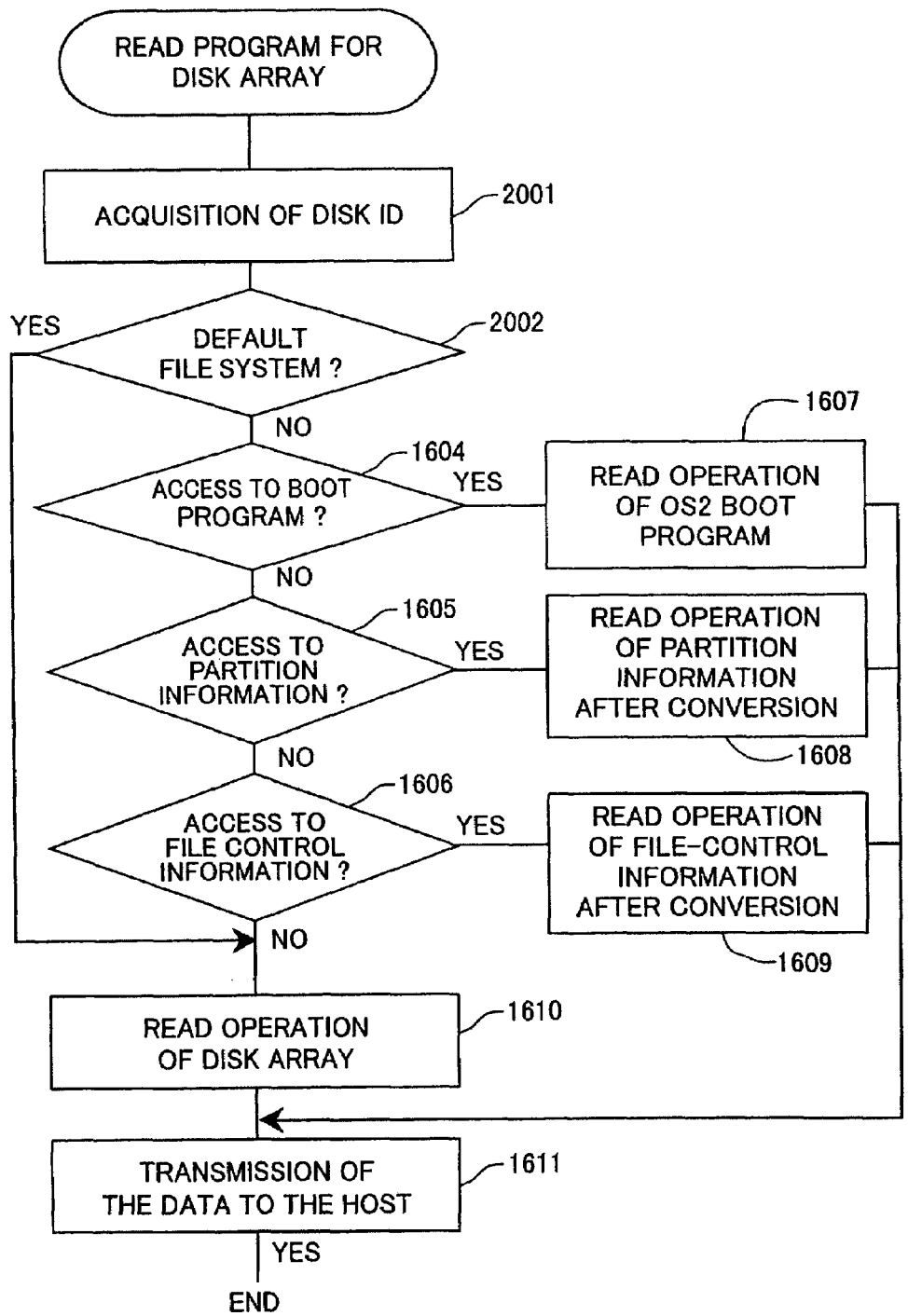
FIG. 20 illustrates a flowchart of a disk-array read program of the embodiment 3.

FIG. 20 illustrates a flowchart of a disk-array reading program of the embodiment 3. As regards steps that are common to those in the flow described in FIG. 16, description will be omitted. Only steps, which are different from those in the flow in FIG. 16, will be described. In a step 2001, a disk ID, which has been transferred by the host, is obtained. For example, when the host issues an input/output request to the disk array controller, the disk ID is transferred from the host to the disk array controller together with the input/output request. In a step 2002, if the host ID indicates the default file system, usual disk-array read processing (step 1610) is performed. If not, processing of the step 1604 described above is performed.

As a result of processing described above, even if the host table 110 of the embodiment 1 is not set, a file can be shared among different file systems.

As an alternative example of the embodiment 3, when the disk array controller has two or more kinds of host connection interfaces, it is also possible to convert a file system corresponding to a kind of the interface.

Embodiment 4

An embodiment 4 is characterized in that the conversion program 109, which was executed in the disk array controller 122 in the embodiment 1, is processed in the host.

Figure 21:
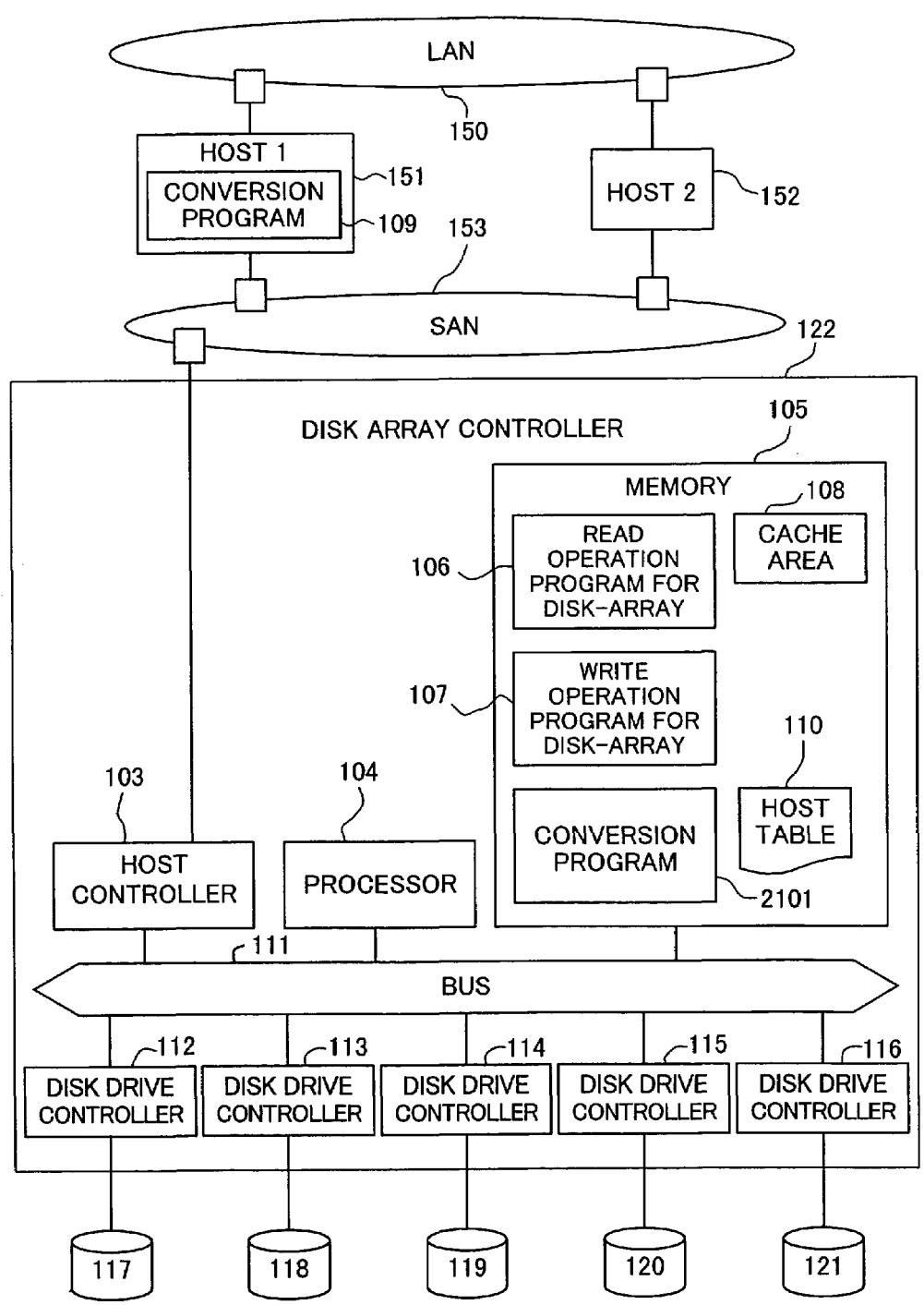
FIG. 21 is a diagram illustrating a configuration of a whole system that uses a storage system of an embodiment 4 according to the present invention.

FIG. 21 is a diagram illustrating a configuration of a whole system that uses a storage system of the embodiment 4 according to the present invention. A large part of the configuration shown in FIG. 21 is the same as that shown in FIG. 1. However, the configuration in FIG. 21 is different from that shown in FIG. 1 on the following points: the host 1 (151) has the conversion program 109; and the disk array controller 122 has a conversion control program 2101.

Figure 22:
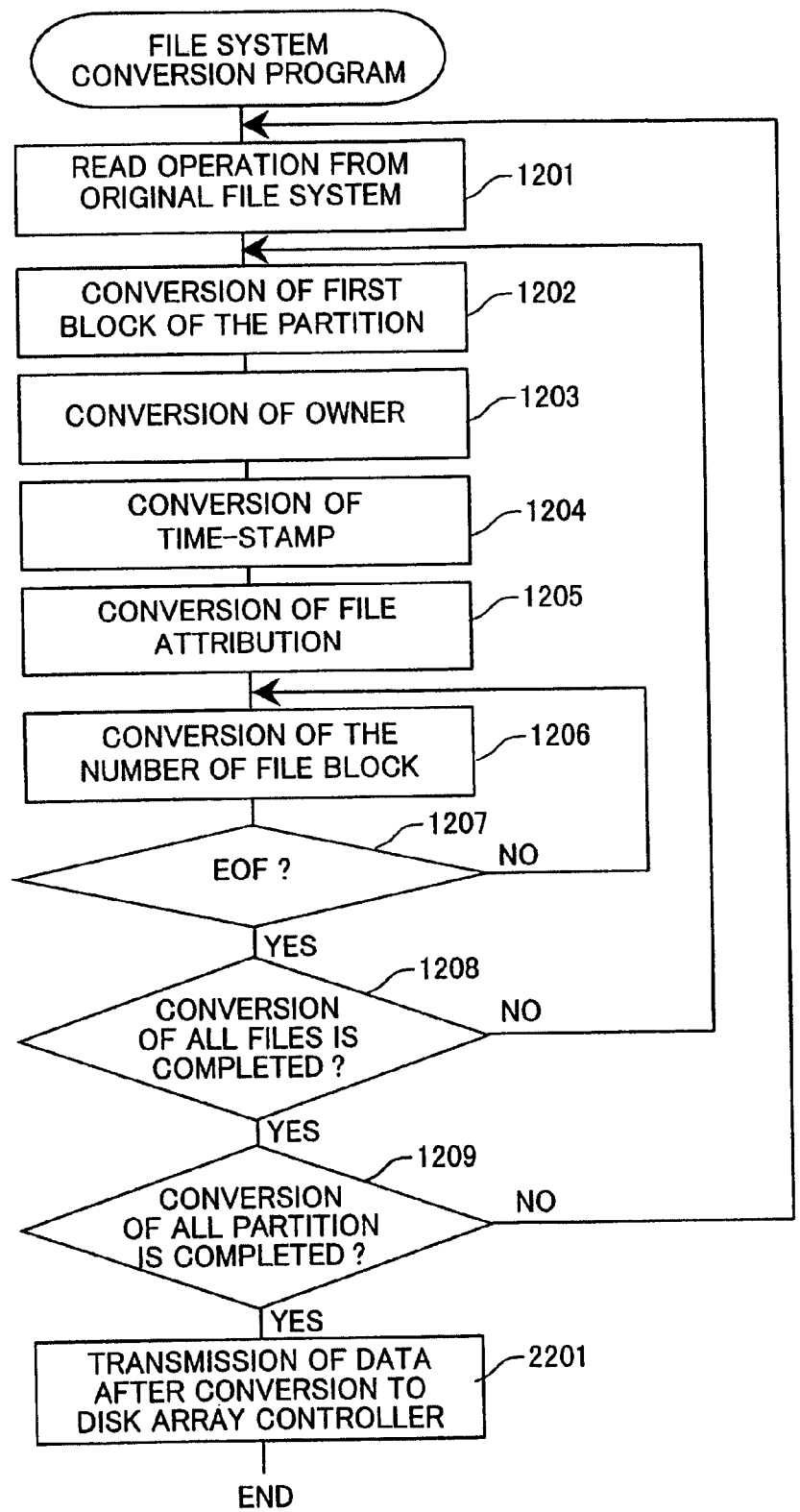
FIG. 22 illustrates a flowchart of a file system conversion program of the embodiment 3 according to the present invention.

FIG. 22 illustrates a flowchart of a file system conversion program in this embodiment. As regards steps similar to those described in FIG. 14, description will be omitted. This flow is characterized in that in a step 2201, converted file management information is transferred from the host 1 to the disk array controller 122 using a special command.

As soon as the converted file management information is transferred to the disk array controller 122, the conversion control program 2101 is started.

Figures 23, 25:
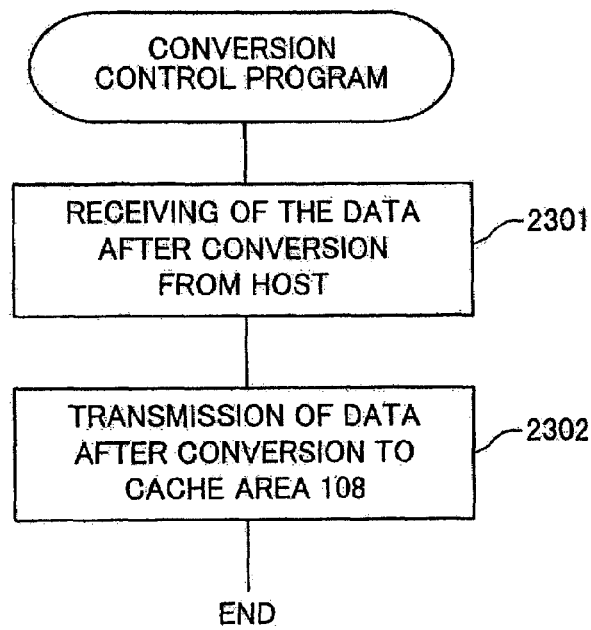
FIG. 23 illustrates a flowchart of a conversion control program.
FIG. 25 illustrates a configuration of a lock table 2401.

FIG. 23 illustrates a flowchart of the conversion control program 2101. In a step 2301, the file management information, which has been transferred from the host 1, is received. In a step 2302, the received file management information is transferred to the cache area 108. As a result of the processing described above, it is possible to realize the same state as that shown in FIG. 15. In this embodiment, because the host 1 performs the file system conversion processing, a load of the control processor 104 in the disk array controller 122 is reduced. Moreover, even if a management format of a file system, which operates on the host 1 and the host 2, is changed, changing a program executed on the host enables flexible support for the change.

Embodiment 5

An object of an embodiment 5 is to avoid discrepancy in data even if a plurality of hosts access the same file to write data therein.

Figure 24:
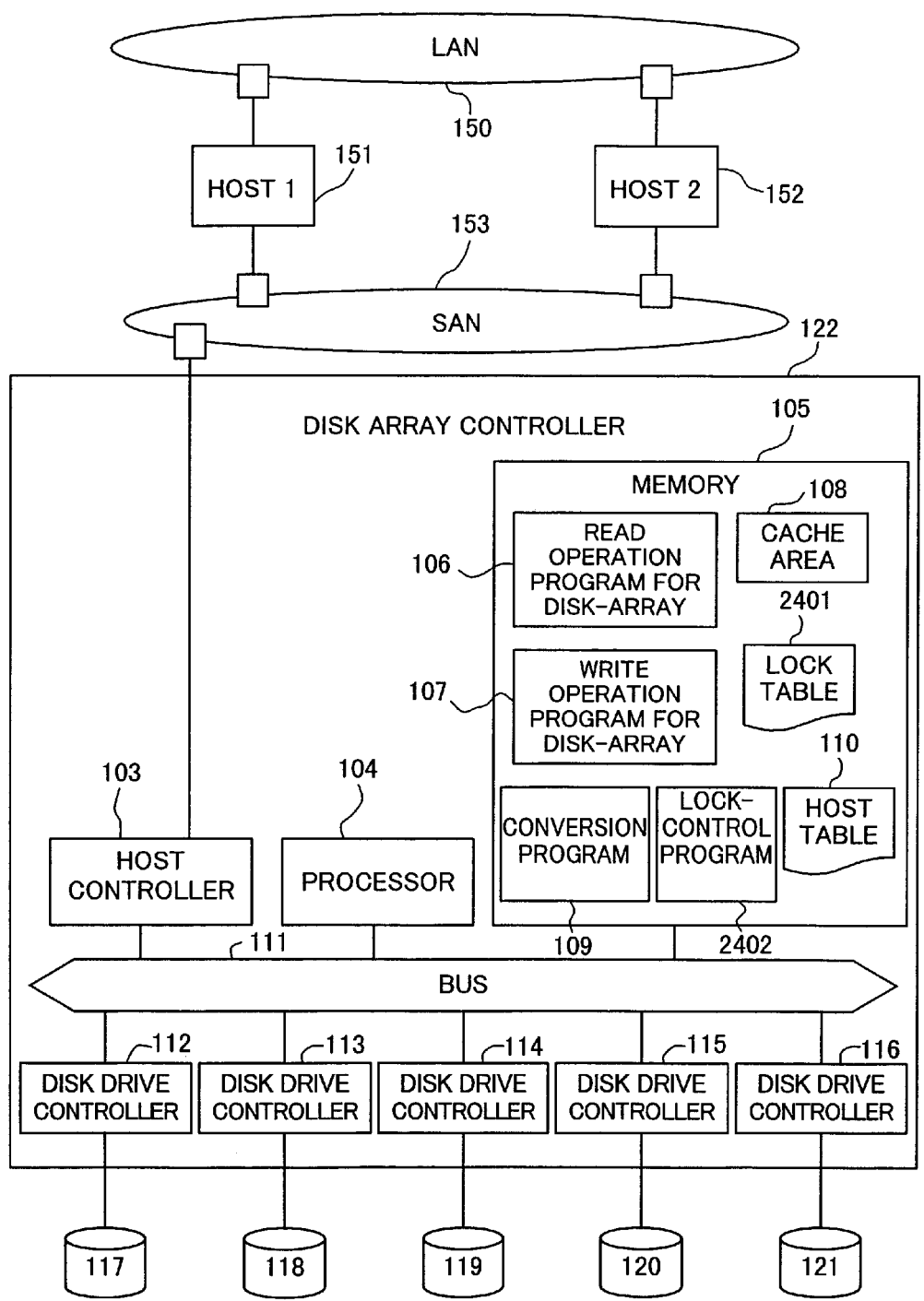
FIG. 24 is a diagram illustrating a configuration of a whole system that uses a storage system of an embodiment 5 according to the present invention.

FIG. 24 is a diagram illustrating a configuration of a whole system that uses a storage system of the embodiment 5 according to the present invention. A large part of the configuration shown in FIG. 24 is the same as that shown in FIG. 1. However, the configuration in FIG. 24 is different from that shown in FIG. 1 on the following points: a lock table 2401 and a lock control program 2402 are provided in the disk array controller 122; and a disk-array write program is changed. The lock control program 2402 is a program for controlling write operation so that discrepancy in data does not occur when a write request is issued from a certain host to a file that is shared among a plurality of hosts. In the lock table 2401, information, such as whether or not there is a file lock, is stored.

FIG. 25 illustrates a configuration of the lock table 2401. In a column 2501, a file name, which is stored in a storage system, is stored. A column 2502 indicates whether or not a file at left is locked for the purpose of write control. A column 2503 indicates an identifier of a host that has locked a file at left. A column 2504 indicates a lock owner of a file at left. A column 2505 indicates the number of times a file at left is locked.

FIG. 26 is a diagram illustrating control used when an application, which operates in the host 151, locks/unlocks the disk array controller 122. The host 2 (152) can also be explained similarly using the diagram. On the host 151, the application program 202 and the OS 203 operate. In the OS 203, there is the file system 204. When updating a file stored in the disk array controller 122, the application program 202 starts update of data after locking the data in order to prevent the other host (in this embodiment, the host 2) from updating the file simultaneously.

To be more specific, the host 151 locks a file A to be accessed using the following command:

LOCK ("A", "Application A")

Then, the host 151 sends the following write command:

WRITE ("A", DATA, 1024, "Application A")

After that, the host 151 unlocks the file A using the following command:

UNLOCK ("A", "Application A")

Figure 27:
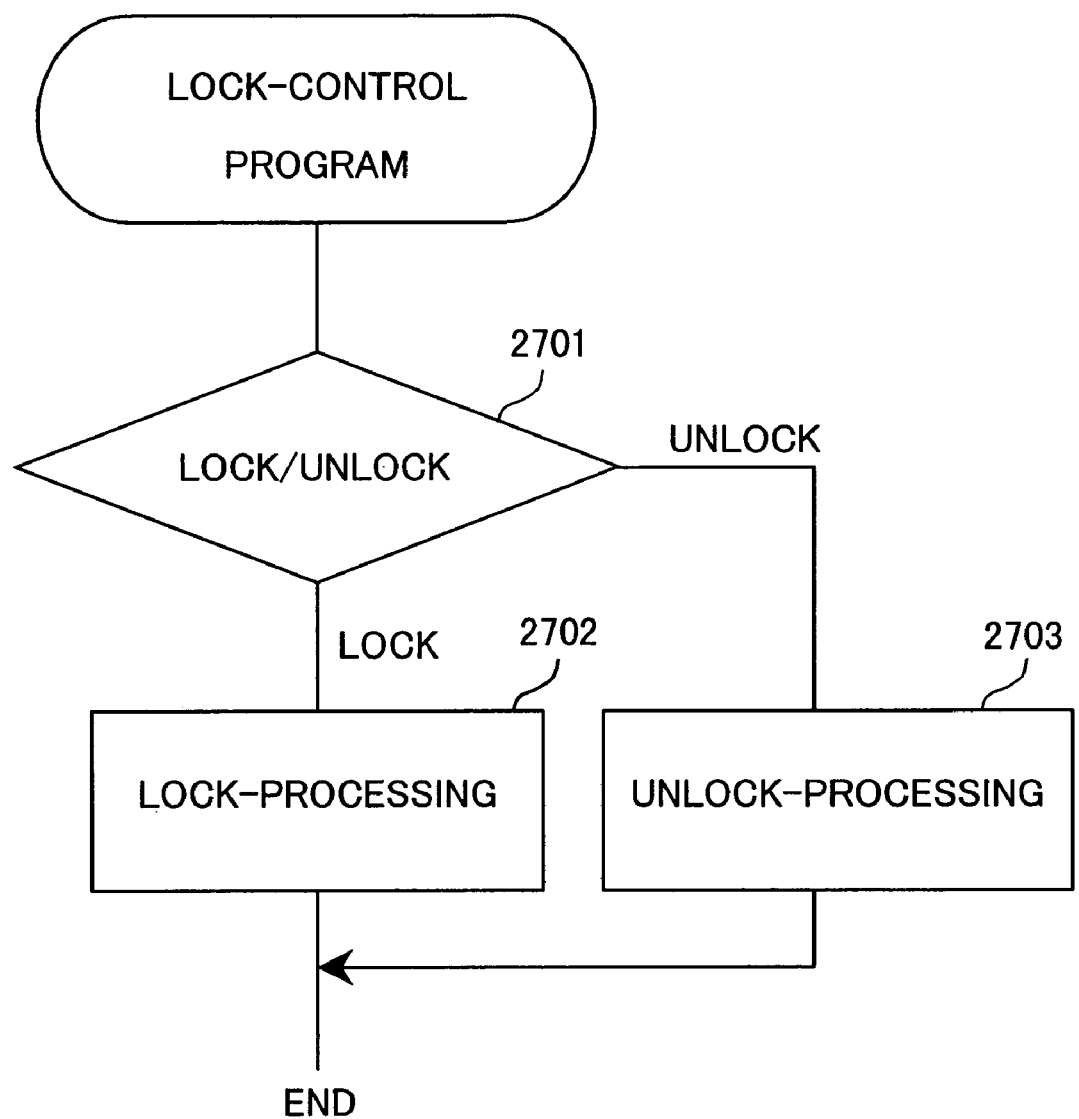
FIG. 27 illustrates a flowchart of a lock control program.

FIG. 27 illustrates a flowchart of the lock control program 2402. In a step 2701, whether a request from the host is a command for a lock or a command for an unlock is judged. If the request is the command for a lock, LOCK processing is executed (step 2702). If not, UNLOCK processing is executed (step 2703).

Figure 28:
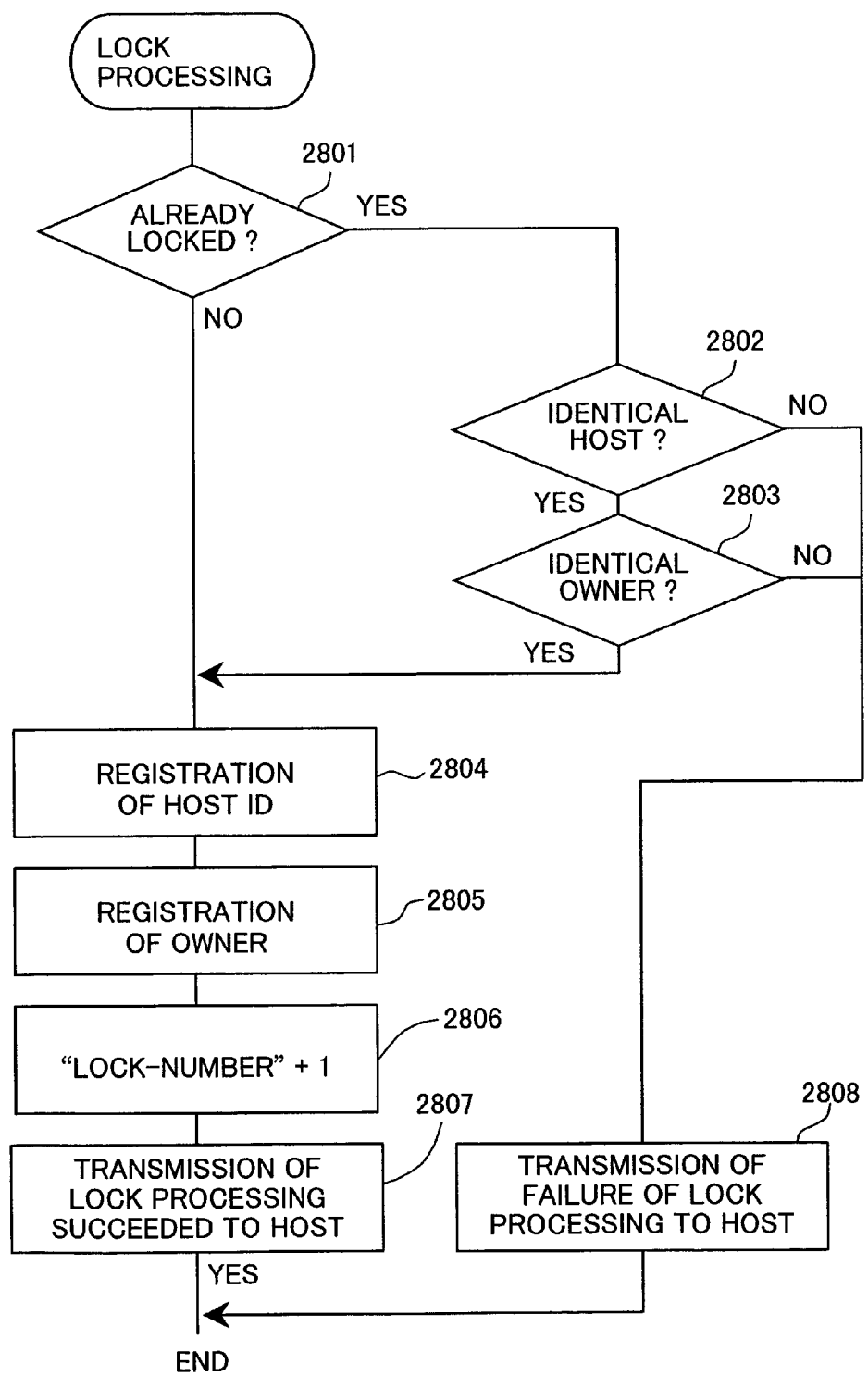
FIG. 28 illustrates a flowchart of LOCK processing.

FIG. 28 illustrates a flowchart of LOCK processing. In a step 2801, whether or not the file, for which the host has issued a write request, is in a locked state is judged. This can be judged by referring to the lock table 2401. For example, if a file as a target of the write request is the file A, the file is now in a locked state (refer to FIG. 25). If the file is in the locked state, the process proceeds to a step 2802. If not, the process proceeds to a step 2804. In a step 2802, whether or not the owner host has locked the file is judged. If the owner host has locked the file, the process proceeds to a step 2803. If not, the process proceeds to a step 2808 where the host is notified of failure of locking. In a step 2803, whether or not the same lock owner has locked the file is judged. If the same owner has locked the file, the process proceeds to the step 2804. If not, the process proceeds to the step 2808 where the host is notified of failure of locking. In the step 2804, a host ID is registered in a corresponding column in the lock table 2401. In a step 2805, an owner is registered in a corresponding column of the lock table 2401. In a step 2806, one is added to the lock count in the lock table 2401. For example, when locking the file B, a lock count of the file B is updated to "1". In a step 2807, the host is notified of success of locking.

Figure 29:
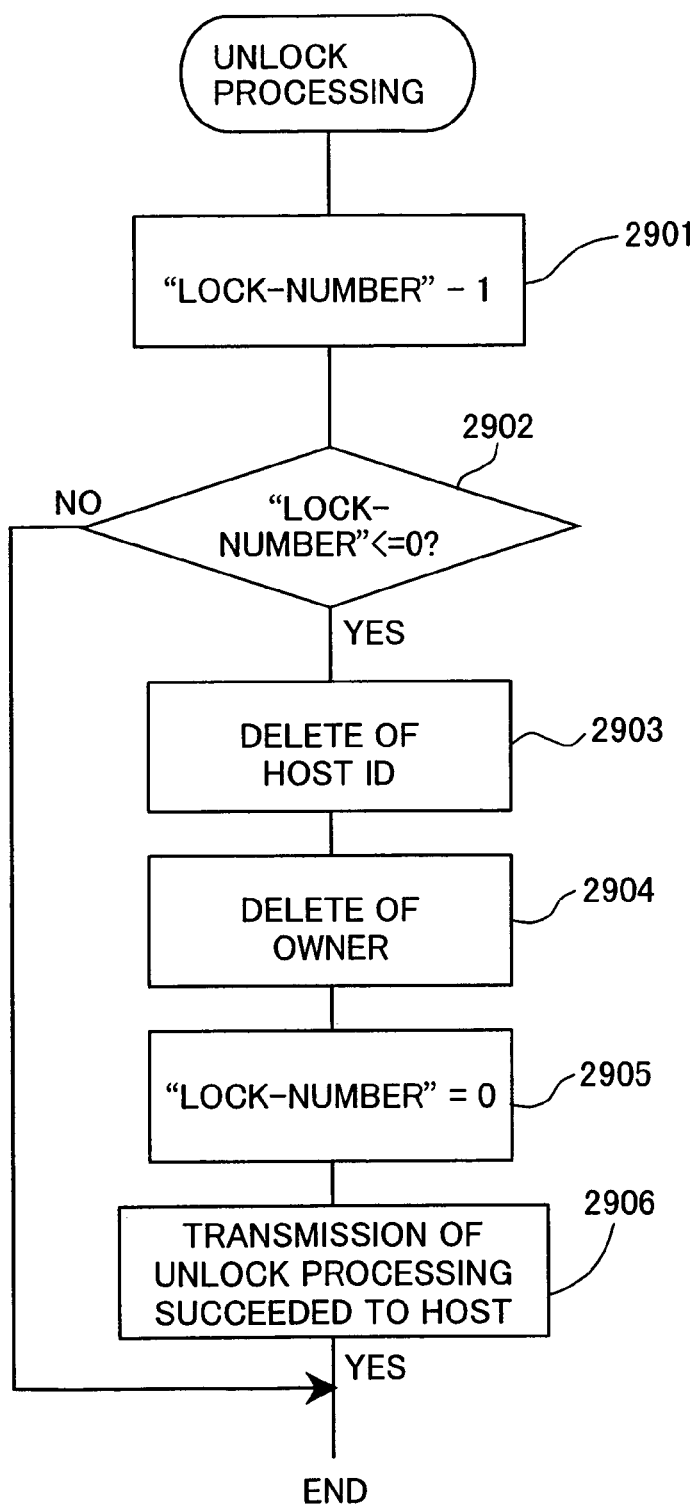
FIG. 29 illustrates a flowchart of UNLOCK processing.

FIG. 29 illustrates a flowchart of UNLOCK processing. In a step 2901, one is subtracted from a lock count, which is registered in the lock table 1401. For example, when unlocking a file C, a lock count of the file C is updated to "1". In a step 2902, whether or not the lock count is 0 or less is judged. If the lock count is 0 or less, the process proceeds to a step 2903. If not, the process proceeds to end. If the lock count is 0 or less, this means that all locks are unlocked. Therefore, in the step 2903, a host ID in the lock table 2401 is deleted. In a step 2904, an owner in the lock table is deleted. In a step 2905, a lock count in the lock table is set to 0. In the step 2906, the host is notified of success of UNLOCK.

Figure 30:
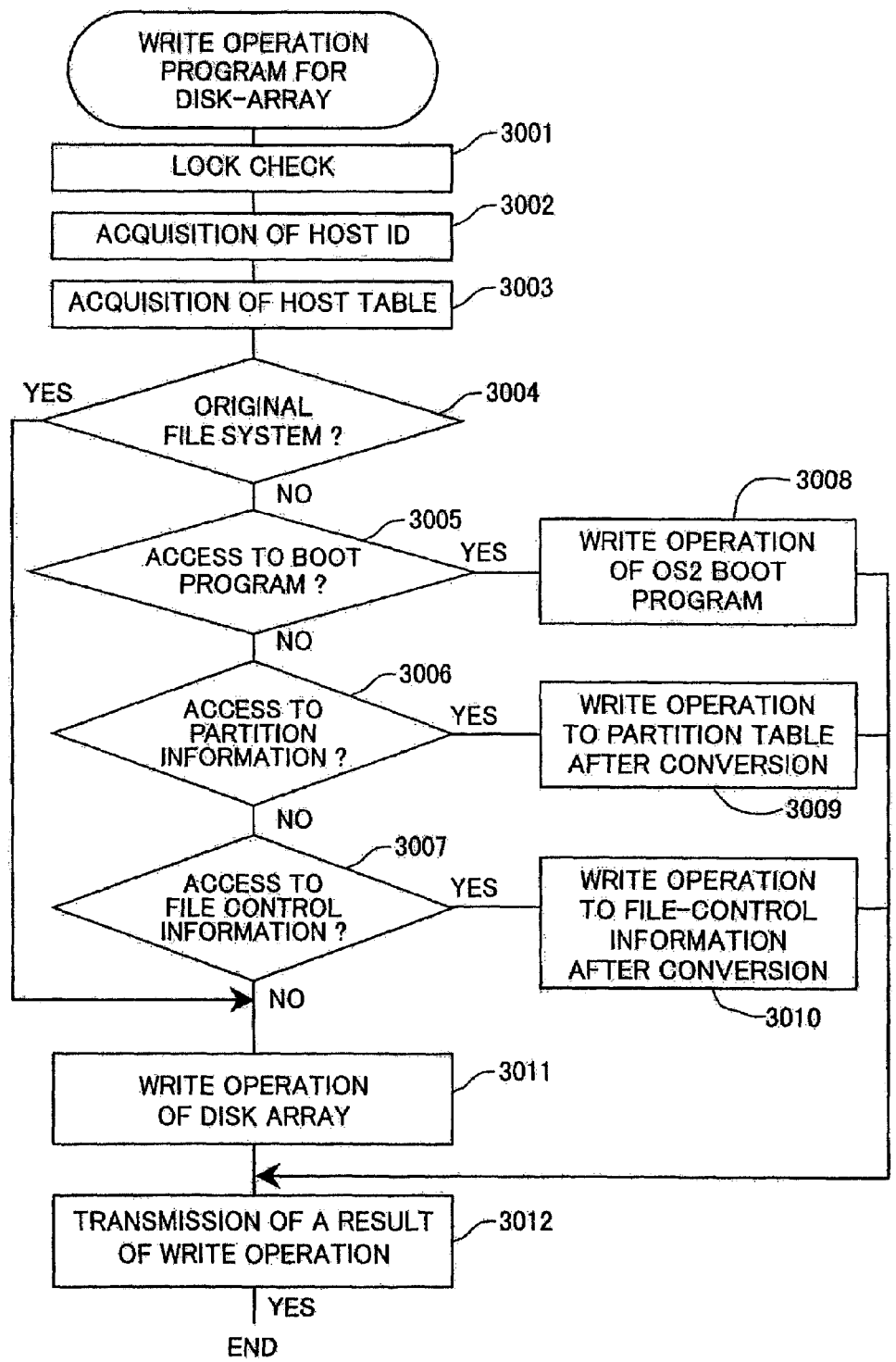
FIG. 30 illustrates a flowchart of a disk-array write program of the embodiment 3 according to the present invention.

FIG. 30 illustrates a flowchart of the disk-array write program of the embodiment 3. In a step 3001, inspection is performed to check whether or not it is locked. A flowchart of the lock check is shown in FIG. 31.

Figure 31:
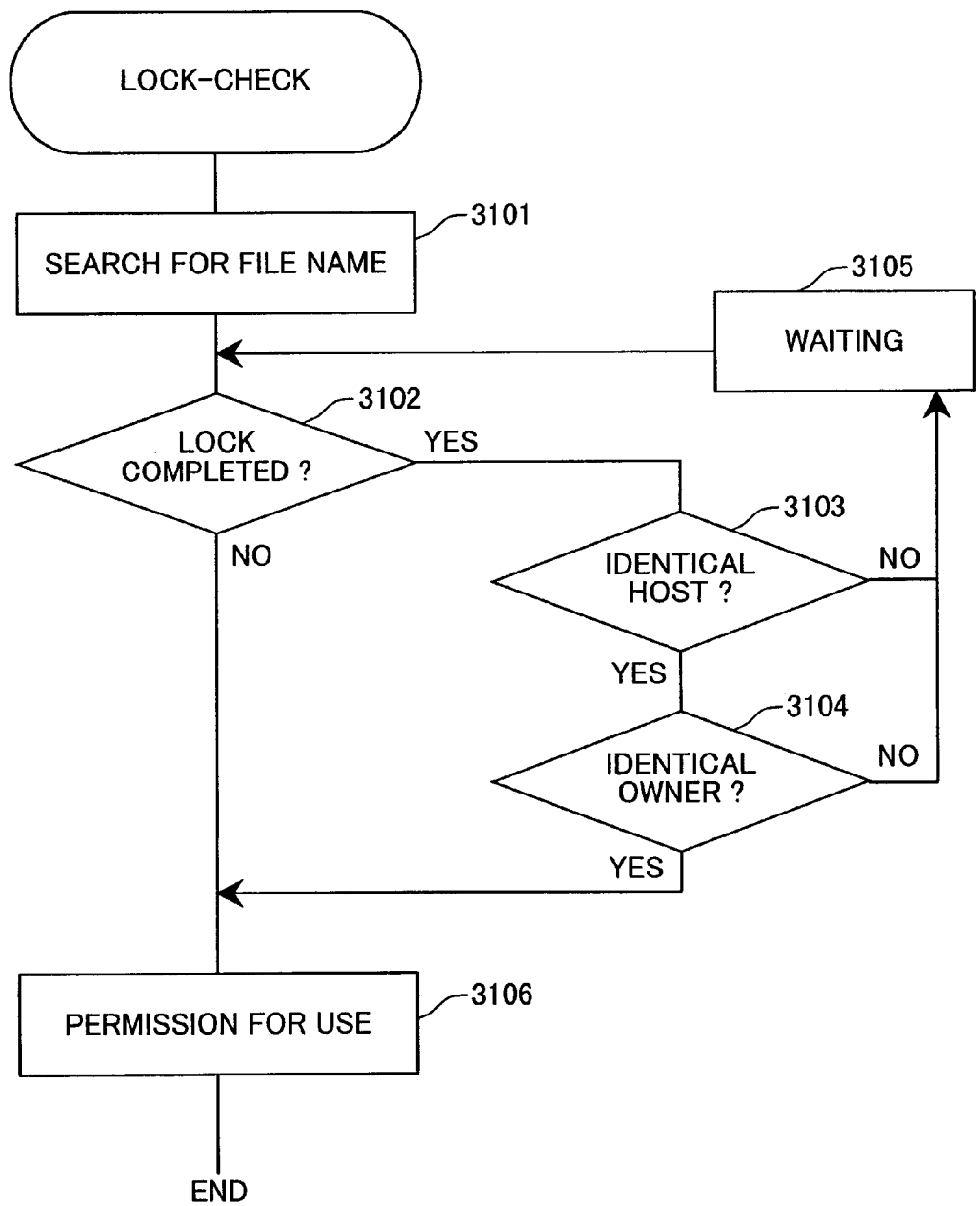
FIG. 31 illustrates a flowchart of LOCK check.

In FIG. 31, in a step 3101, a file name is searched from a disk address of a disk, which has been written, and from file management information. In a step 3102, with reference to the file name and the lock table 2401, whether or not the file is locked is judged. If the file is locked, the process proceeds to a step 3103. If not, the process proceeds to a step 3106. In the step 3103, whether or not the host, which has locked the file, is the same as the owner host is judged. If the host is the same as the owner host, the process proceeds to a step 3104. If not, the process proceeds to a step 3105. In the step 3105, after waiting for given time, the step 3102 is executed again. In the step 3104, whether or not it is the same owner is judged. If it is the same owner, the process proceeds to the step 3106 where use is allowed. If not, the process proceeds to the step 3105. As a result, the inspection of locking is completed.

FIG. 30 will be described again. If permission for use is gotten, the process proceeds to the step 3002 where a disk ID, which has been transferred by the host, is obtained. The disk ID is an identifier that is transferred from the host to the disk array controller together with an input/output request when, for example, the host issues the input/output request to the disk array controller. In a step 3003, a host table is obtained. In a step 3004, whether or not it is an original file system of the host, which has issued an access request, is judged. If it is the original file system, the process proceeds to a step 3011. If not, the process proceeds to a step 3005. The original file system means the one which has stored the file into the disk device. This embodiment is based on the assumption that the original file system is the file system of the OS 1. Steps 3005 through 3010 are executed when there is a request from a file system, which is different from the file system that has stored the file in the disk device. To be more specific, when an access request is issued from the file system of the OS 2, the steps are executed. In the step 3005, whether or not it is an access to the OS 2 boot program is judged. If it is the access to the OS 2 boot program, the process proceeds to the step 3008. If not, the process proceeds to the step 3006. In the step 3008, data, which has been transferred from the host, is written into the OS 2 boot program. In the step 3006, whether or not it is an access to partition information is judged. If it is the access to the partition program, the process proceeds to a step 3009. If not, the process proceeds to a step 3007. In the step 3009, data, which has been transferred from the host, is written into partition information after conversion. In the step 3007, whether or not it is an access to file management information is judged. If it is the access to the file management information, the process proceeds to the step 3010. If not, the process proceeds to a step 3011. In the step 3010, data, which has been transferred from the host, is written into file management information after conversion. The meaning of the boot program, the partition information after conversion and the file management information after conversion are similar to that described in the embodiment 1. In the step 3011, usual disk-array write processing is performed, and data is written into a requested disk address. In a step 3012, a result of a write operation is transferred to the host. As a result of processing described above, even if a plurality of hosts write simultaneously, serialized processing can avoid discrepancy in data caused by a simultaneous write.

Embodiment 6

An object of an embodiment 6 is to update file information in real time when sharing a file between the plurality of hosts 151, 152. In general, when writing to a disk, in order to speed up the processing, a file system, which operates in a host, holds update data temporarily in a memory in the host, and does not update data in the disk immediately. However, for example, when sharing a file between the hosts 151, 152, the host 2 does not refer to contents that are held in the memory in the host 1 by the file system of the host 1. Therefore, if update of the information is late, discrepancy in data may occur. This embodiment aims to solve this problem.

Figure 32:
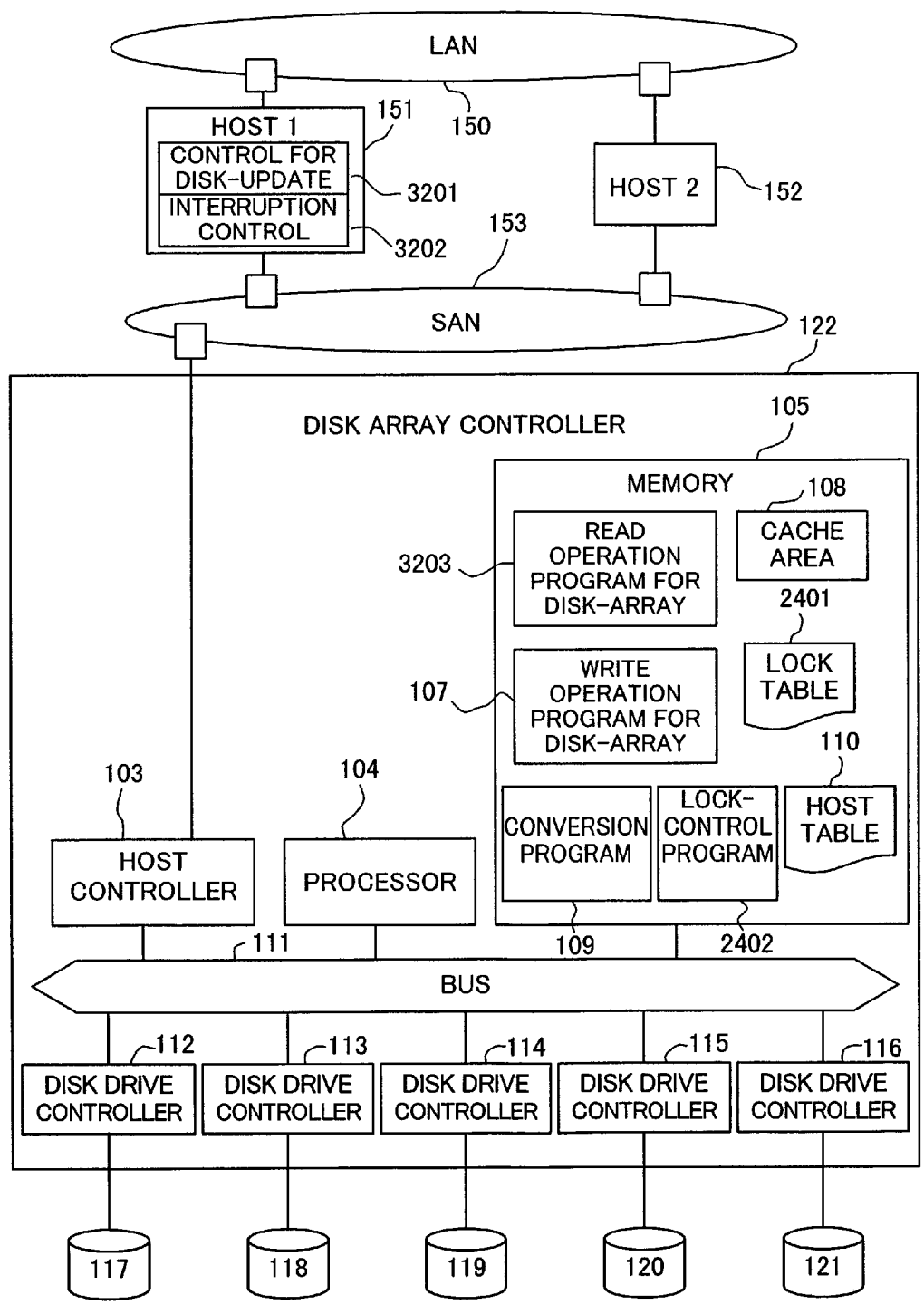
FIG. 32 is a diagram illustrating a configuration of a whole system that uses a storage system of an embodiment 6 according to the present invention.

FIG. 32 is a diagram illustrating a configuration of a whole system that uses a storage system of the embodiment 6 according to the present invention. A large part of the configuration shown in FIG. 32 is the same as that shown in FIG. 24. However, the configuration in FIG. 32 is different from that shown in FIG. 24 on the following points: in the disk array controller 122, the host 1 (151) has a disk-update control program 3201, an interrupt control program 3202, and a function of transferring unwritten data in the host 151 to the disk array controller 122; and a disk-array read program 3203 is changed.

Figure 33:
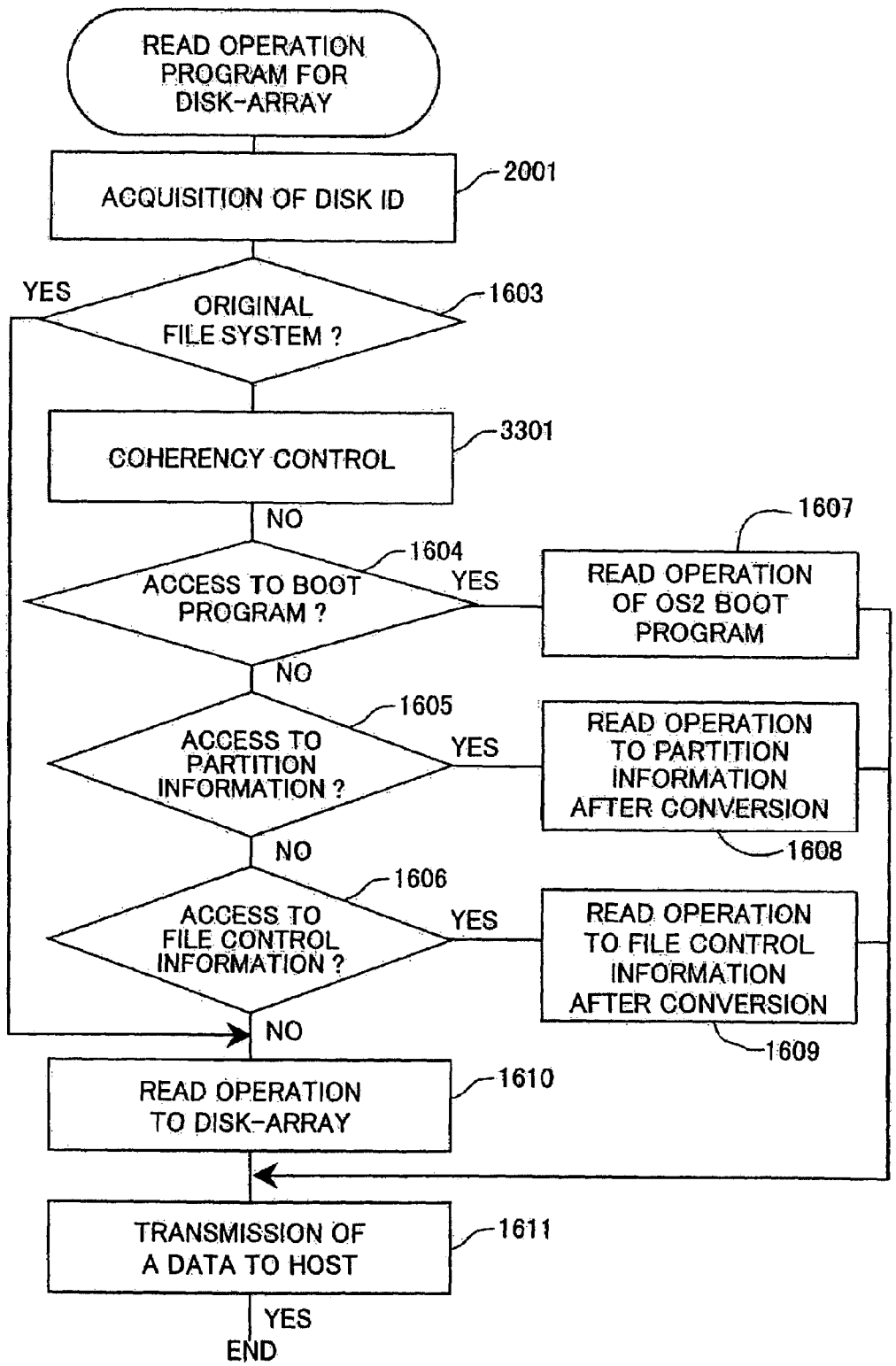
FIG. 33 illustrates a flowchart of a disk-array read program of the embodiment 6 according to the present invention.

FIG. 33 illustrates a flowchart of a disk-array read program of the embodiment 6. As regards steps similar to those described in FIGS. 16 and 20, description will be omitted. This flow is characterized in that, in a step 3301, synchronization control is performed so as to reflect unwritten data of the host in a disk. A flowchart of the synchronization control is shown in FIG. 34.

In a step 3401, a disk output request of unwritten data is issued from the disk array controller 122 to the host 151. In a step 3402, the process waits until write from the host 151 to the disk is completed.

Figure 34:
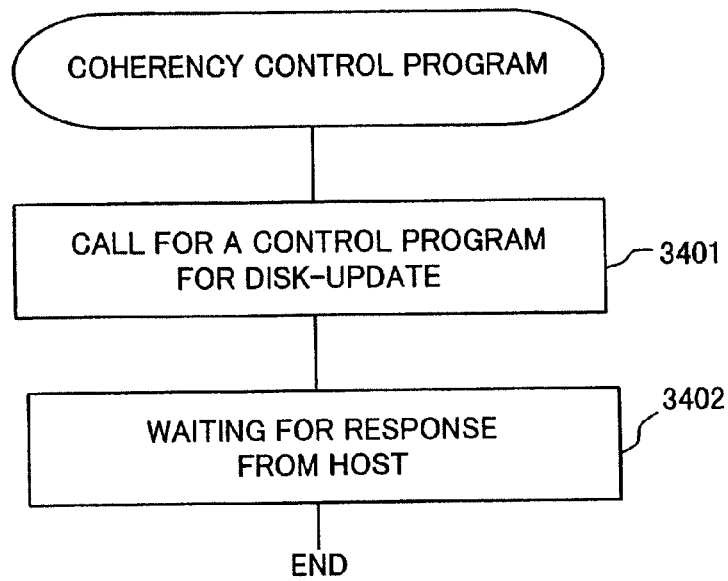
FIG. 34 illustrates a flowchart of synchronization control.
Figure 35:
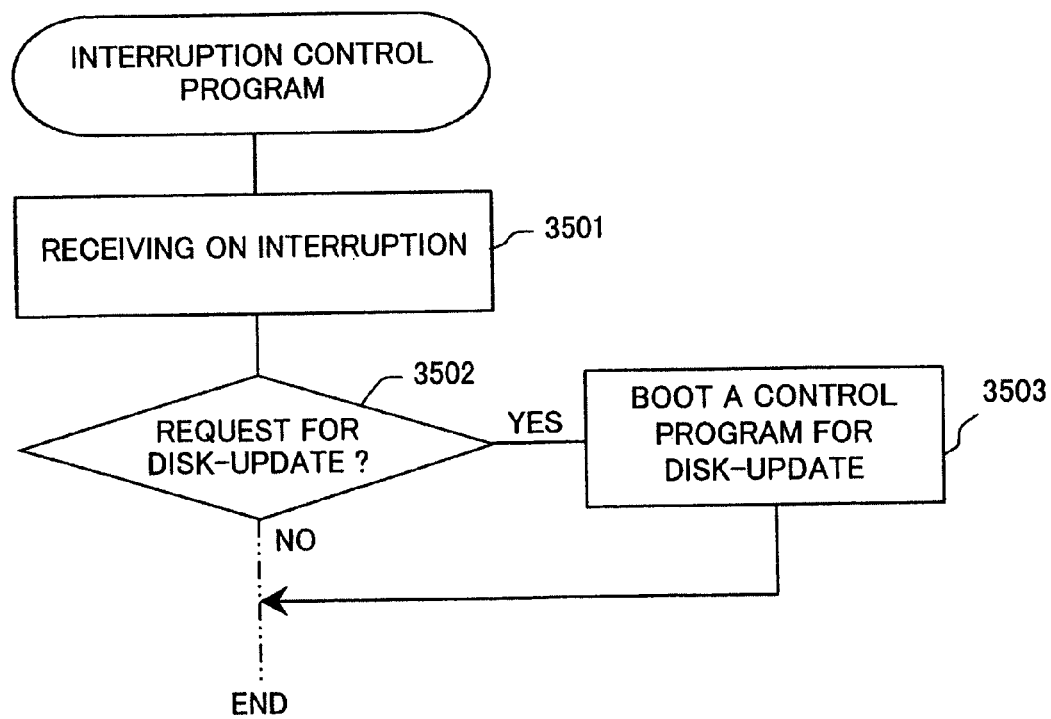
FIG. 35 illustrates a flowchart of an interrupt control program.

FIG. 35 illustrates a flowchart of the interrupt control program 3202, which is executed in the host 151 when the step 3401 in FIG. 34 is executed. When the step 3401 is executed, the host 151 detects occurrence of an external interrupt. In a step 3501, this interrupt is accepted. In a step 3502, whether or not a kind of the interrupt is a disk update request from the disk array controller 122 is judged. If the kind is the disk update request, the process proceeds to a step 3503. If not, another interrupt judgment is performed. In the step 3503, the disk-update control program 3201 is started.

Figure 36:
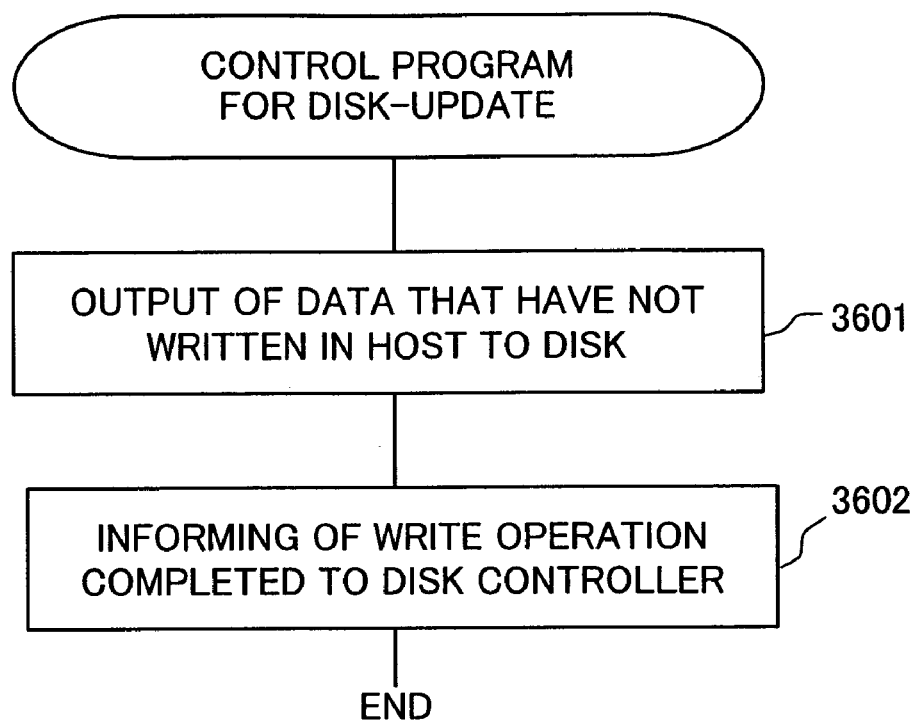
FIG. 36 illustrates a flowchart of a disk-update control program.

FIG. 36 illustrates a flowchart of the disk-update control program 3201. In a step 3601, unwritten data of the host 151 is written into the disk array controller 122. The OS 1 operating in the host 151 has a disk update function. Therefore, this can be realized when the OS 1 calls this function. In a step 3602, the disk array controller 122 is notified that update of the unwritten data has been completed. As a result of processing described above, when the plurality of hosts share a disk, a result of update by one host can be reflected in an access of another host immediately.

Embodiment 7

An object of an embodiment 7 is to improve decrease in performance caused by sharing of files when sharing the files among a plurality of hosts. To be more specific, accessing a single disk by the plurality of hosts may cause conflict, which results in decrease in performance. This embodiment provides a sharing method by which performance does not decrease even at the time of file sharing using a split function in disk mirroring.

Figure 37:
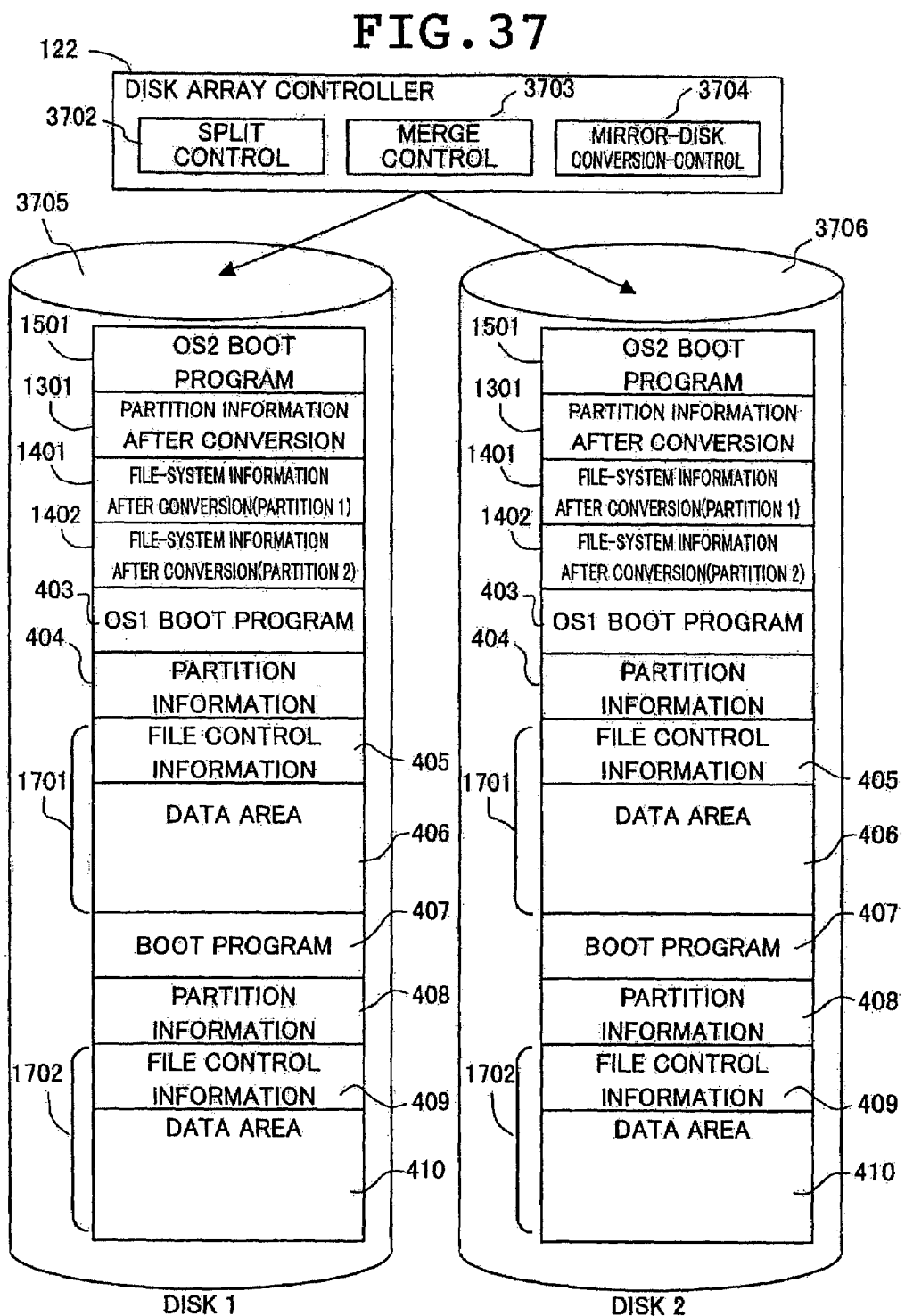
FIG. 37 is a diagram illustrating a split function of an embodiment 7 according to the present invention.

FIG. 37 is a diagram illustrating the split function of a disk array. The disk array controller 122 has a (mirroring) function of writing the same data in a disk 1 (3705) and a disk 2 (3706) in order to improve input/output performance and reliability. The split function comprises split control and merge control. Split control 3702 permits a host to access two mirrored disks as two independent disks temporarily. Merge control 3703 changes the disks, which have been divided into two, back into one at the time of completion of processing by the host. In addition to it, the merge control 3703 reflects data, which has been updated while the disk was divided into two, in each disk. In this embodiment, in addition to these functions, a mirrored-disk conversion control program 3704 is provided to apply the split function to file sharing. As a result of the mirroring, contents of two disk devices 3705, 3706 become the same. Data structure of each individual disk is the same as that shown in FIG. 17.

Figure 38:
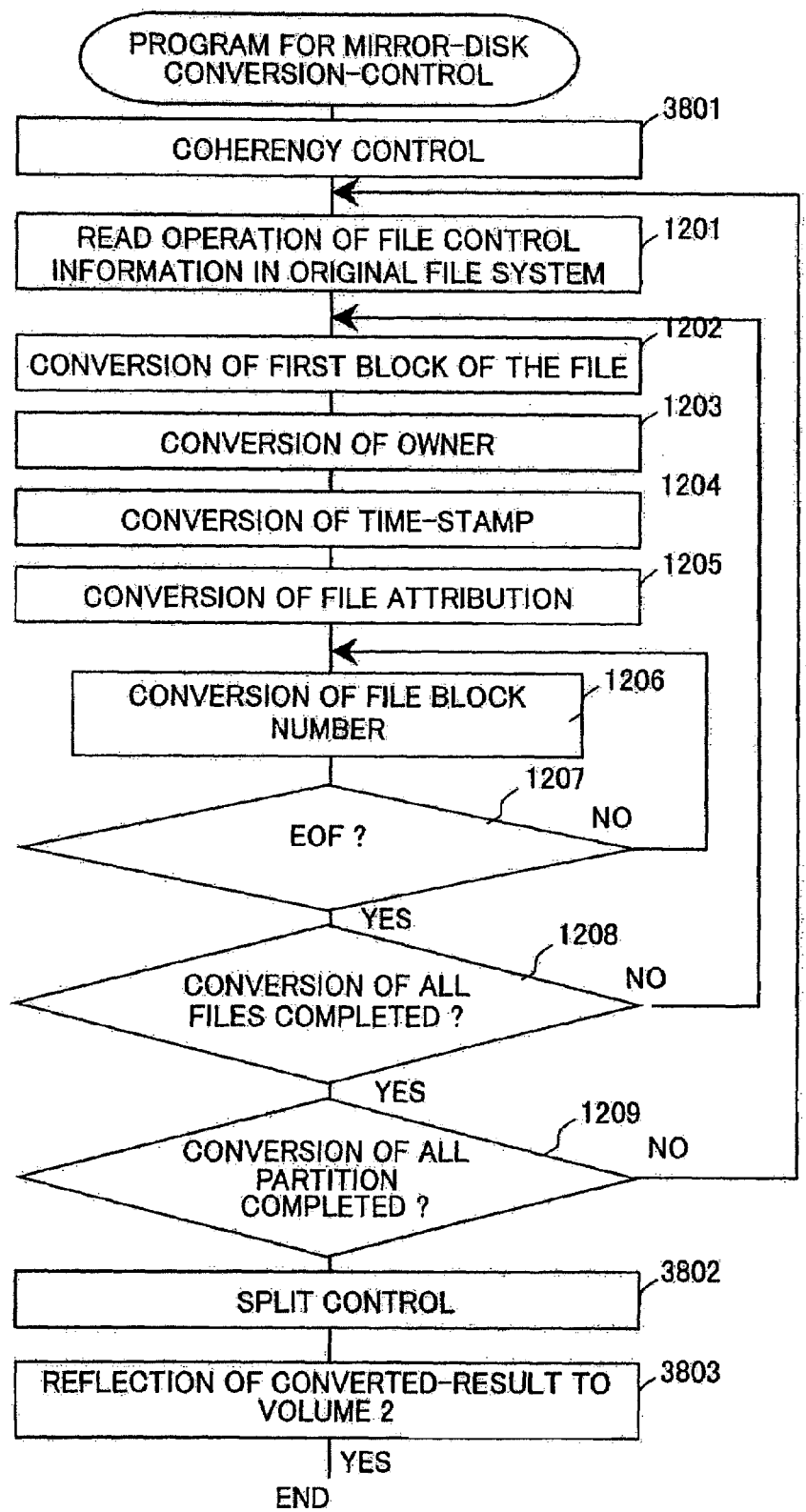
FIG. 38 illustrates a flowchart of a mirrored-disk conversion control program.
Figure 39:
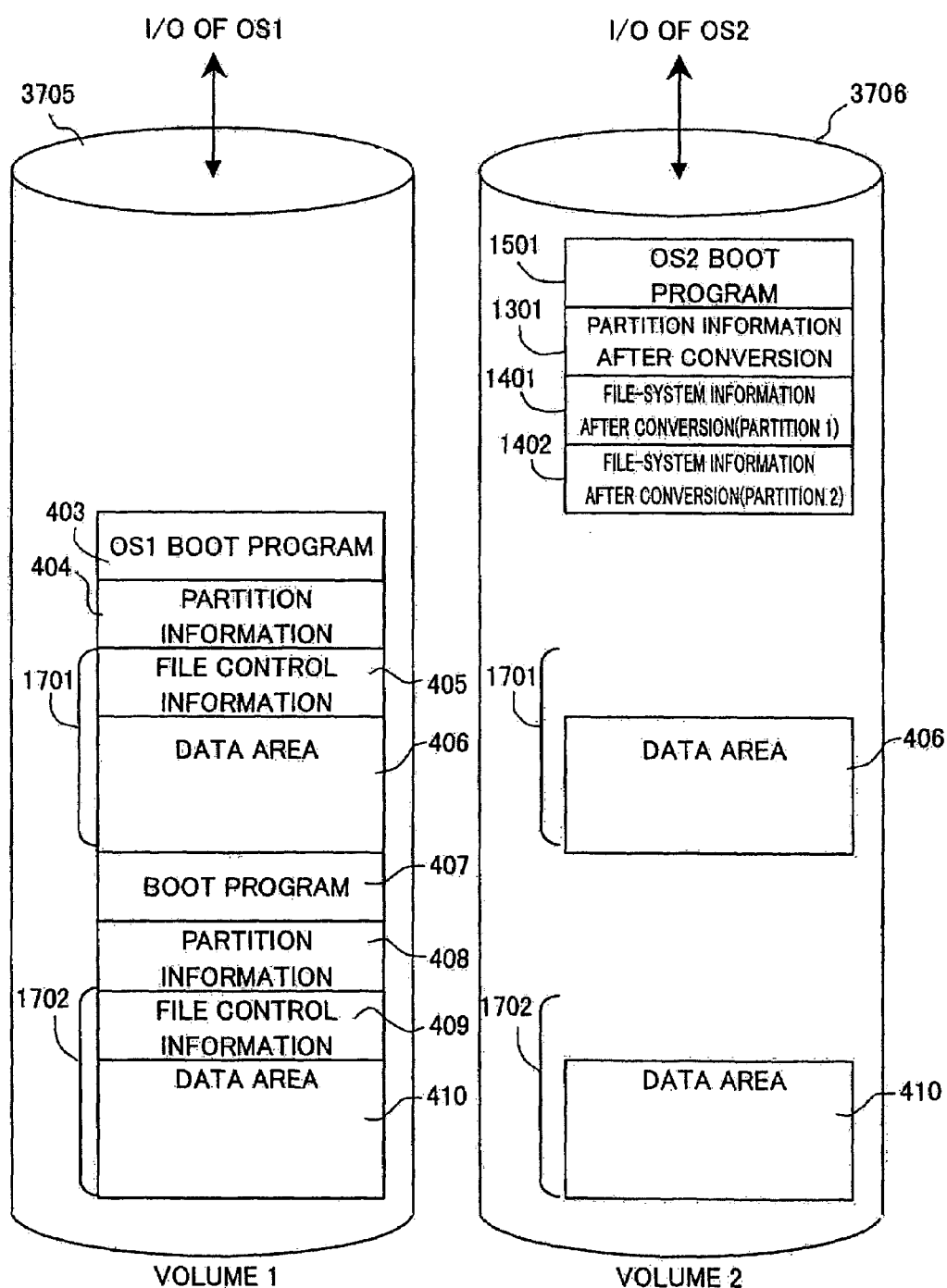
FIG. 39 shows a state of a disk after executing the split control of the embodiment 6 according to the present invention.

FIG. 38 illustrates a flowchart of the mirrored-disk conversion control program 3704. As regards steps similar to those described in FIG. 12, description will be omitted. This flow is characterized in that synchronization control of a step 3801, split control of a step 3802, and conversion result of a step 3803 are reflected in the disk 2. In the step 3802, the split control program 3702 is started, and the disk is divided into the mirrored disk 1 (3705) and the mirrored disk 2 (3706). In a step 3803, converted file information is stored in either of the divided disks. More specifically, as described in the embodiment 1, the OS 2 boot program 1501, the partition information after conversion 1301, and the file system information 1401, 1402 after conversion are stored on either of the disks. As a result of the processing described above, one of the mirrored disks becomes a disk that stores information about the file system, which is different from the original file system. FIG. 39 shows a state of a disk after the split control of this embodiment is executed. Using the disk 1 (3705) as an OS 1's dedicated disk for input/output, and using the disk 2 (3706) as an OS 2's dedicated disk for input/output, result in distributed accesses to different disks even when sharing a disk from a plurality of hosts. Therefore, it is possible to avoid decrease in performance caused by conflict. When data in one disk is updated, the updated contents are reflected by the step 3803.

It is to be noted that the mirrored-disk conversion control program may be started from a console or a host when starting of file sharing is desired, or it may also be started when there is an access from a host having a different platform for the first time.

As described above, according to the present invention, sharing of files stored in a disk device, which is shared among a plurality of hosts each having a platform different from one another, becomes possible.

The invention claimed is:

1. A file sharing method in a storage system, the storage system having a controller and a plurality of disk drives for sharing a file stored in the storage system, and being connected to a first host computer and a second host computer, the first host computer being operatively connected to communicate with said second host computer via a local area network, the storage system being operatively connected to each of the first host computer and the second host computer via a storage area network, the first host computer using a first operating system for managing files using a first format and first file management information, the second host computer using a second operating system for managing files using a second format different from said first format and second file management information, and the storage system storing the first file management information when the file to be shared is stored in the storage system, the first file management information including information of a location of a disk area where the file to be shared is allocated by the first operating system, the second file management information including information of a disk area location capable of being managed by the second operating system, said method comprising the steps of:

receiving at the controller a host ID of said second host computer;

determining via a host table of the controller a conversion for the second host computer to manage said file to be shared;

converting said first file management information into said second file management information; and reading data corresponding to said file to be shared on the basis of said second information from said disk drives by the second host computer.

2. The file sharing method according to claim 1, wherein:

said first operating system manages said location where said file to be shared is allocated on the basis of a block having a first fixed length;

said second operating system manages said location where said file to be shared is allocated on the basis of a block having a second fixed length that is different from said first fixed length; and said conversion step converts a block number of a first block included in said first file management information into corresponding second information according to a ratio of a data length of said first fixed length to a data length of said second fixed length.

3. The file sharing method according to claim 1, wherein:

said second file management information, which has been converted by said conversion step, is stored in a cache area in said storage system.

4. The file sharing method according to claim 1, wherein the first file management information comprises a block number of a first block and a partition of the location where the file to be shared is allocated, and the second file management information comprises a block number of a corresponding first block and corresponding partition of the location where the file to be shared is allocated, the block number of the corresponding first block and the corresponding partition being manageable by the second operating system.

5. A storage system that is connected to a first host computer and a second host computer, the first host computer using a first operating system for managing a file to be shared using a first format and first file management information, and the second host computer using a second operating system for managing files using a second format different from said first format and second file management information, the first host computer being operatively connected to communicate with said second host computer via a local area network, the storage system being operatively connected to each of the first host computer and the second host computer via a storage area network, the storage system storing the first file management information when the file to be shared is stored in the storage system, the first file management information including information of a location of a disk area where the file to be shared is allocated by the first operating system, the second file management information including information of a disk area location capable of being managed by the second operating system, said storage system comprising:
a plurality of disk drives for storing data therein; and
a disk controller comprising an interface for connecting to said first host computer and said second host computer, and an interface for connecting to said plurality of disk drives, wherein:
said disk controller comprises:
a means for receiving a host ID of said second host computer and determining a conversion for the second host computer to manage the file to be shared by the second operating system including a host table;
means for converting said first file management information into said second file management information; and
a means for reading data corresponding to said file to be shared on the basis of the second information from said disk drives when an access request to access said file to be shared is issued from said second host computer.

6. The storage system according to claim 5, wherein:
said means for converting said first file management information into said second file management information is further for converting a block number of a first block of said first information according to a ratio of a data length of a first fixed-length block, which is used when said first operating system manages the location of the disk area where said file to be shared is allocated, to a data length of a second fixed-length block, which is used when said second operating system manages said location of the disk area where said file to be shared is allocated.

7. The storage system according to claim 5, wherein:
said second file management information in said second format corresponding to said first file management information in said first format is held by any one of said plurality of disk drives instead of the disk controller.

8. The storage system according to claim 7, wherein:
a first disk drive and a second disk drive of said plurality of disk drives hold said first file management information, and said second information respectively; and
both of said first disk drive and said second disk drive hold said file.

9. The storage system according to claim 8, wherein:
said disk controller accesses said first disk drive when an access request to access said file is issued from said first host computer; and
said disk controller accesses said second disk drive when an access request to access said file is issued from said second host computer.

10. The storage system according to claim 5, wherein:
said disk controller comprises a means for exclusive control of an access request from said second host computer when said access request to access said file to be shared from said second host computer conflicts with an access request to access said file to be shared from said first host computer.

11. The storage system according to claim 5, wherein
the first file management information comprises a block number of a first block and a partition of the location where the file to be shared is allocated, and
the second file management information comprises a block number of a corresponding first block and corresponding partition of the location where the file to be shared is allocated, the block number of the corresponding first block and the corresponding partition being manageable by the second operating system.

12. A storage system that is connected to a first host computer and a second host computer, the first host computer being operatively connected to communicate with said second host computer via a local area network, the storage system being operatively connected to each of the first host computer and the second host computer via a storage area network, the first host computer using a first operating system for managing a file to be shared using a first format and first file management information, the second host computer using a second operating system for managing files using a second format different from said first format and second file management information, the storage system storing the first file management information when the file to be shared is stored in the storage system, the first file management information including information of a location of a disk area where the file to be shared is allocated by the first operating system, the second file management information including information of a disk area location capable of being managed by the second operating system, said storage system comprising:
a plurality of disk drives for storing data therein; and
a disk controller comprising an interface for connecting to said first host computer and said second host computer, and an interface for connecting to said plurality of disk drives; wherein:
said disk controller mirrors said file to be shared, which is stored in any one of said plurality of disk drives and is managed under said first operating system, in another disk drive of said plurality of disk drives;
said disk controller converts via a host table said first file management information into a corresponding second file management information to write the corresponding second file management information into said another disk drive; and
said disk controller reads said file to be shared from said another disk drive when an access request to access said file to be shared is issued from said second host computer.

13. The storage system according to claim 12, wherein:
said disk controller converts said first file management information into said second file management information according to a ratio of a data length of a first fixed-length block, which is used when said first operating system manages the location where said file to be shared is allocated, to a data length of a second fixed-length block, which is used when said second operating system manages said location where the file to be shared is allocated.

14. The storage system according to claim 12, wherein
the first file management information comprises a block
number of a first block and a partition of the location
where the file to be shared is allocated, and
the second file management information comprises a
block number of a corresponding first block and corresponding partition of the location where the file to be
shared is allocated, the block number of the corresponding first block and the corresponding partition
being manageable by the second operating system.

* * * * *